US012573413B2

(12) United States Patent
Xia et al.

(10) Patent No.: US 12,573,413 B2
(45) Date of Patent: Mar. 10, 2026

(54) AUDIO CODING METHOD AND RELATED APPARATUS, AND COMPUTER-READABLE STORAGE MEDIUM

(71) Applicant: HUAWEI TECHNOLOGIES CO., LTD., Guangdong (CN)

(72) Inventors: Bingyin Xia, Beijing (CN); Jiawei Li, Beijing (CN); Zhe Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 476 days.

(21) Appl. No.: 18/154,197

(22) Filed: Jan. 13, 2023

(65) Prior Publication Data

US 2023/0154473 A1 May 18, 2023

Related U.S. Application Data

(63) Continuation of application No. PCT/CN2021/106855, filed on Jul. 16, 2021.

(30) Foreign Application Priority Data

Jul. 16, 2020 (CN) ......................... 202010688152.0

(51) Int. Cl.
*G10L 19/02* (2013.01)
*G10L 25/21* (2013.01)
*G10L 19/008* (2013.01)

(52) U.S. Cl.
CPC .......... *G10L 19/0204* (2013.01); *G10L 25/21* (2013.01); *G10L 19/008* (2013.01)

(58) Field of Classification Search
CPC . G10L 19/0204; G10L 19/008; G10L 19/028; G10L 19/005; G10L 25/21
See application file for complete search history.

(56) References Cited

U.S. PATENT DOCUMENTS 8,516,350 B2 * 8/2013 Gaal ..................... H04L 5/0094 714/790
8,825,496 B2 * 9/2014 Setiawan ................ G10L 19/03 704/500

(Continued)

FOREIGN PATENT DOCUMENTS

CN 101662288 A 3/2010
CN 101681623 A 3/2010

(Continued)

*Primary Examiner* — Paras D Shah
*Assistant Examiner* — Nadira Sultana
(74) *Attorney, Agent, or Firm* — WOMBLE BOND DICKINSON (US) LLP

(57) ABSTRACT

An audio decoding method includes: obtaining an encoded bitstream; performing bitstream demultiplexing on the encoded bitstream to obtain a first coding parameter of a current frame; performing bitstream demultiplexing on the encoded bitstream based on a configuration parameter for tonal component coding to obtain a second coding parameter of the current frame, where the second coding parameter of the current frame includes a tonal component parameter; obtaining a first high frequency band signal and a first low frequency band signal of the current frame based on the first coding parameter; obtaining a second high frequency band signal of the current frame based on the second coding parameter and the configuration parameter for tonal component coding; and obtaining a decoded signal of the current frame based on the first high frequency band signal, the second high frequency band signal, and the first low frequency band signal.

19 Claims, 10 Drawing Sheets

(56) References Cited

U.S. PATENT DOCUMENTS

| | | | | |
|---|---|---|---|---|
| 9,153,236 | B2 * | 10/2015 | Setiawan | G10K 11/16 |
| 9,626,972 | B2 * | 4/2017 | Liu | G10L 19/005 |
| 2008/0270125 | A1 * | 10/2008 | Choo | G10L 19/0204 704/E21.011 |
| 2009/0006103 | A1 * | 1/2009 | Koishida | G10L 19/008 704/500 |
| 2013/0275142 | A1 * | 10/2013 | Hatanaka | G10L 19/0208 704/500 |
| 2014/0310007 | A1 | 10/2014 | Lee et al. | |
| 2015/0162010 | A1 * | 6/2015 | Ishikawa | G10L 19/00 704/500 |
| 2015/0332699 | A1 * | 11/2015 | Liu | G10L 19/20 704/205 |
| 2017/0025130 | A1 * | 1/2017 | Nagisetty | G10L 19/0204 |
| 2017/0256267 | A1 * | 9/2017 | Disch | G10L 19/06 |
| 2018/0211676 | A1 * | 7/2018 | Zernicki | G10L 19/032 |
| 2019/0272837 | A1 * | 9/2019 | Nemer | G10L 19/005 |

FOREIGN PATENT DOCUMENTS

| | | | |
|---|---|---|---|
| CN | 103366751 | A | 10/2013 |
| CN | 104103276 | A | 10/2014 |
| CN | 104584124 | A | 4/2015 |
| KR | 100316769 | B1 | 1/2002 |

* cited by examiner

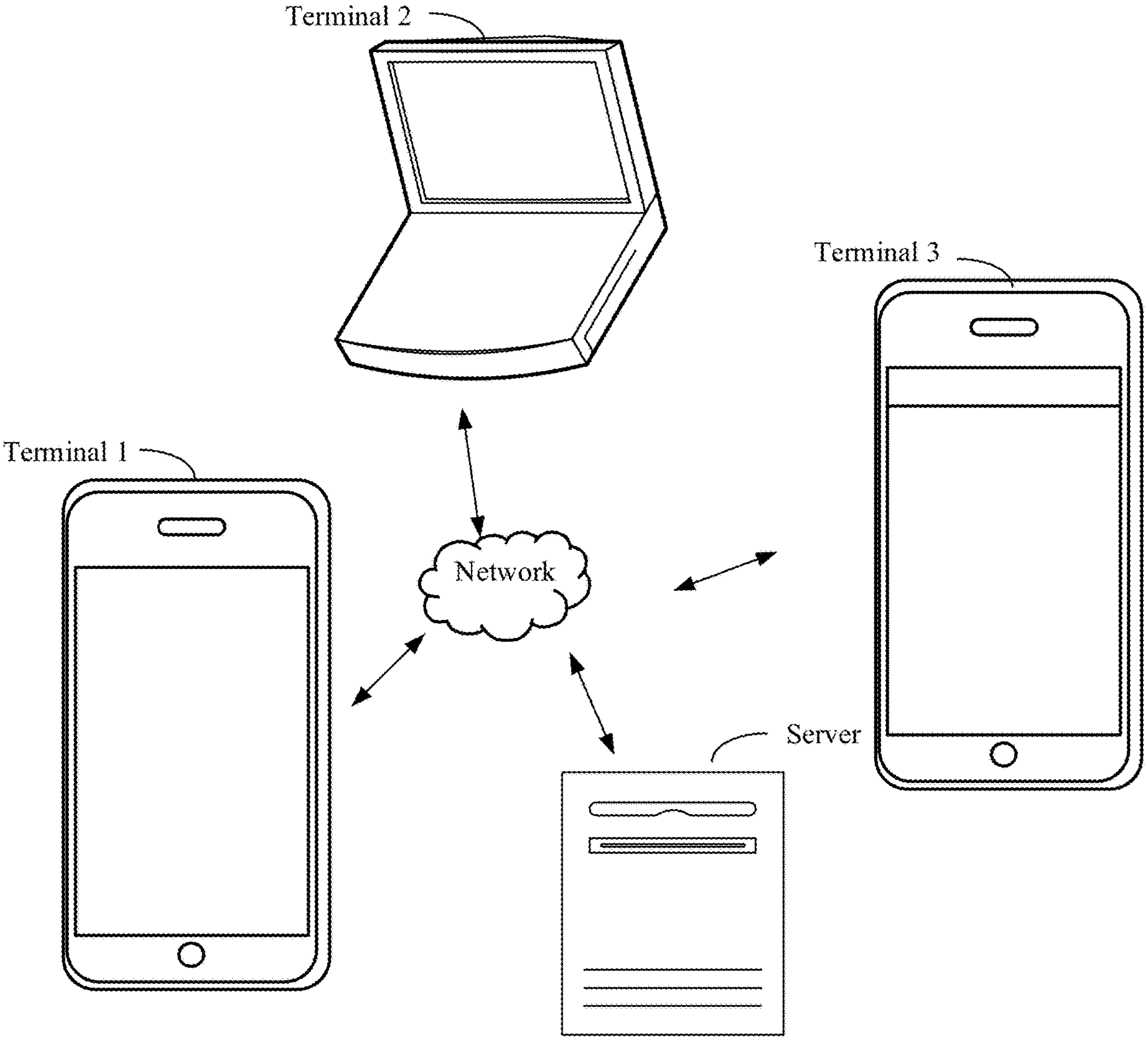
FIG. 1-A

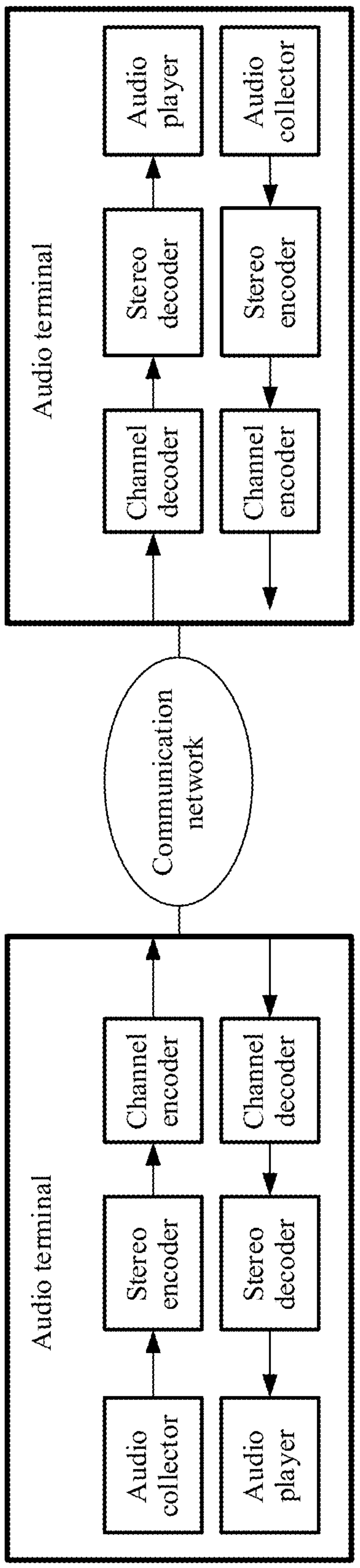
FIG. 1-B

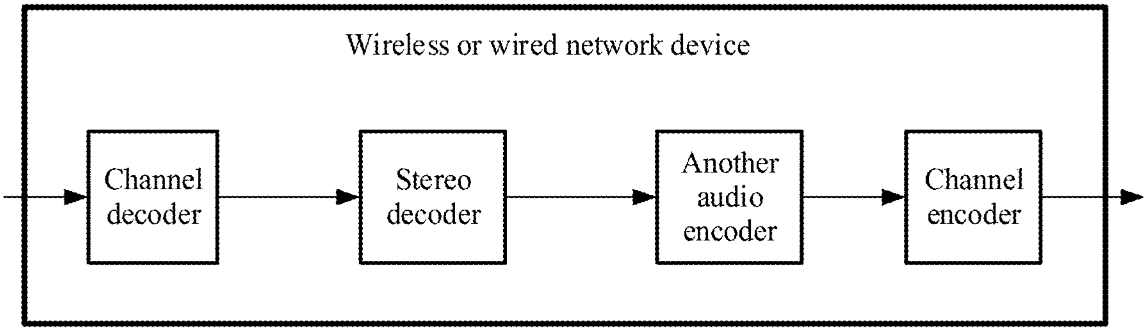
FIG. 1-C
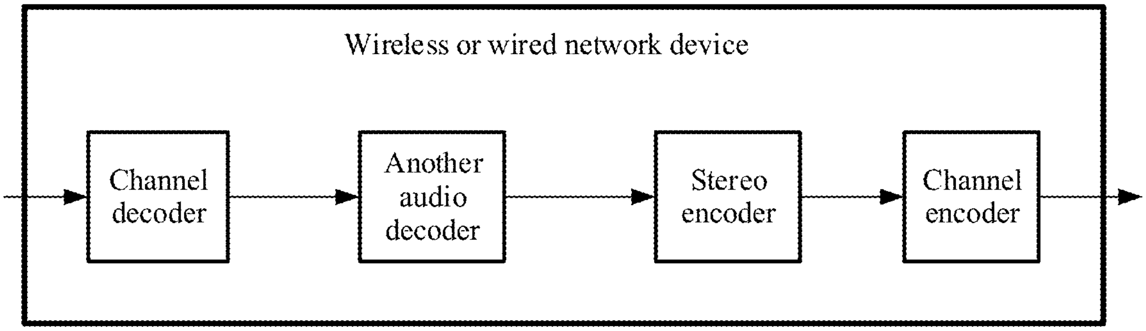
FIG. 1-D

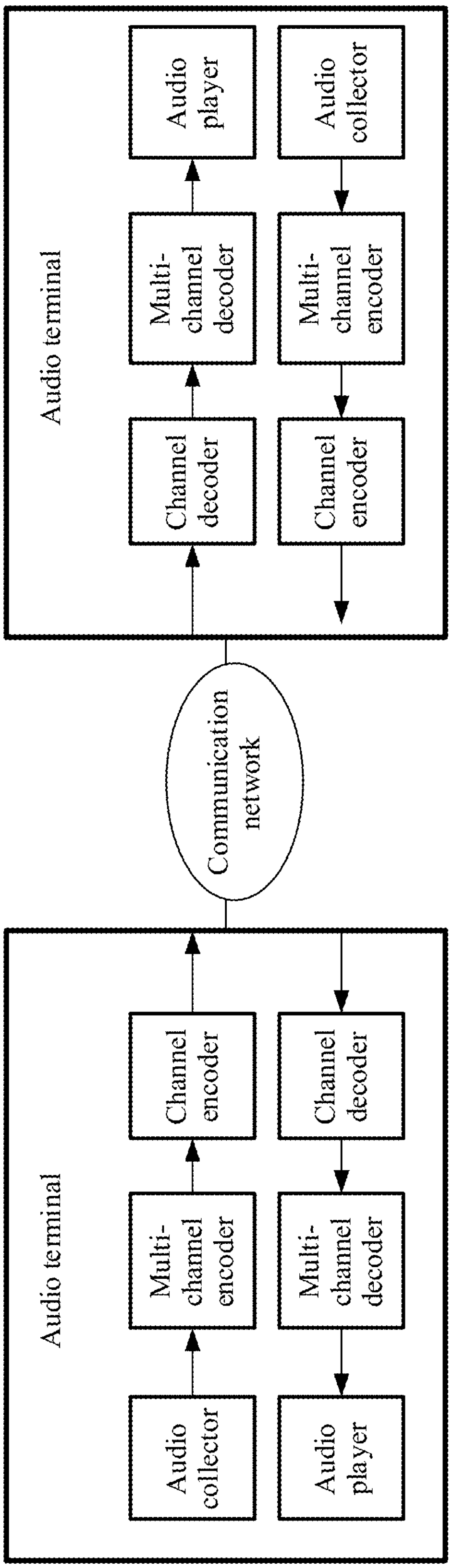
FIG. 1-E

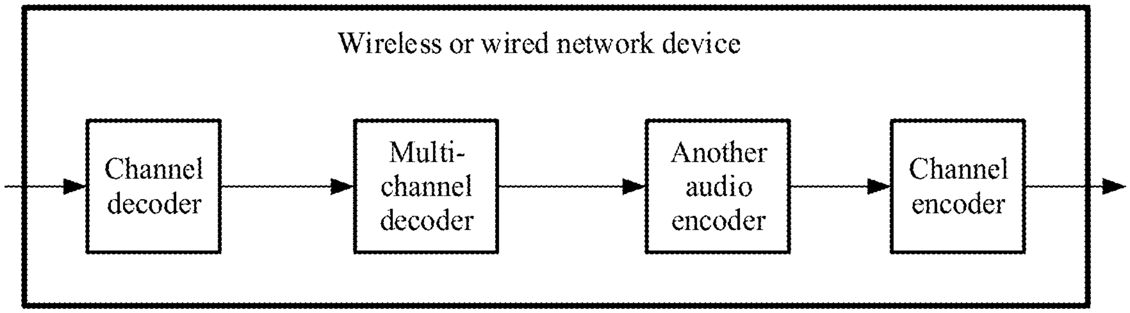
FIG. 1-F
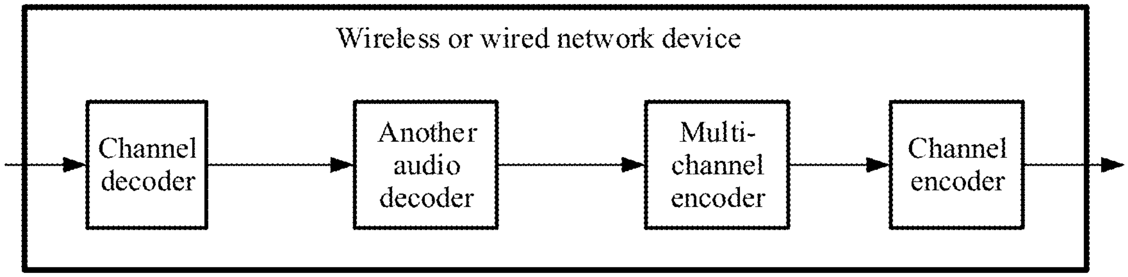
FIG. 1-G

FIG.4-A

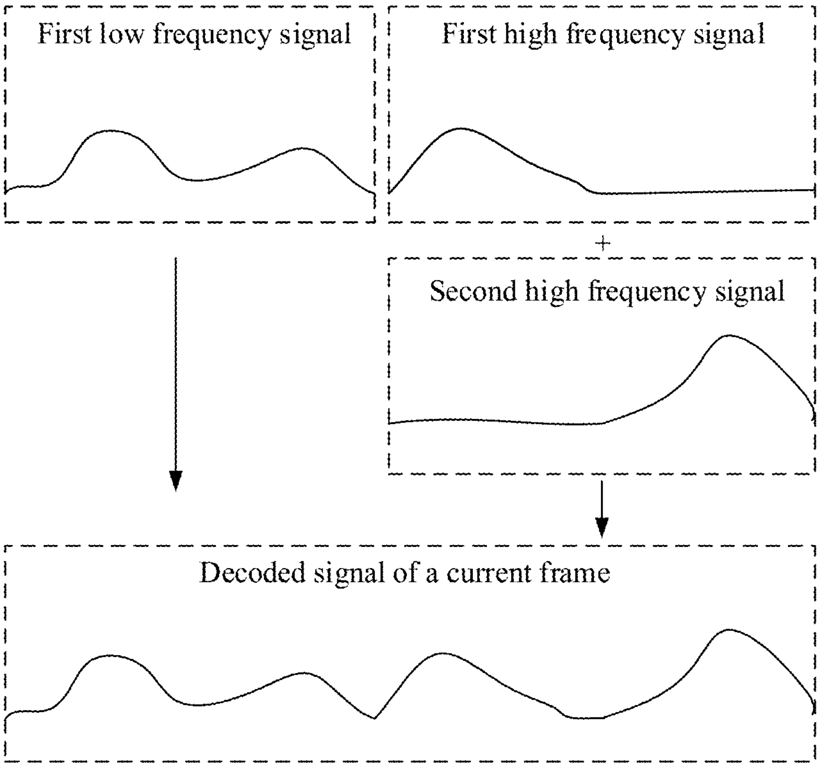
FIG. 4-B
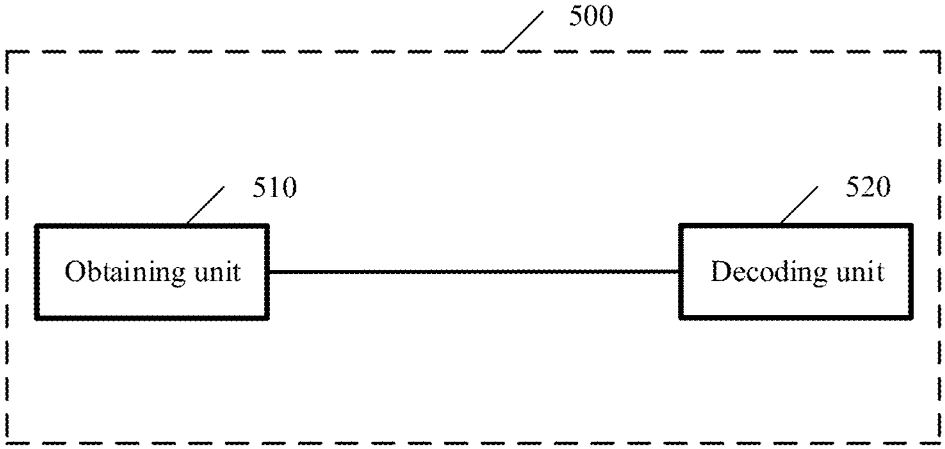
FIG. 5

AUDIO CODING METHOD AND RELATED APPARATUS, AND COMPUTER-READABLE STORAGE MEDIUM

CROSS-REFERENCE TO RELATED APPLICATIONS

This application is a continuation of International Application No. PCT/CN2021/106855, filed on Jul. 16, 2021, which claims priority to Chinese Patent Application No. 202010688152.0, filed on Jul. 16, 2020. The disclosures of the aforementioned applications are hereby incorporated by reference in their entireties.

TECHNICAL FIELD

This application relates to the field of audio technologies, and in particular, to an audio coding method, a related communication apparatus, and a related computer-readable storage medium.

BACKGROUND

At present, with progress of society and continuous development of technologies, users have increasingly high requirements for audio services. How to provide a service of higher quality for a user in a case of a limited coding bit rate, or how to provide a service of same quality for a user by using a lower coding bit rate has always been a focus of audio coding research. Some international standards organizations (for example, the Third Generation Partnership Project (3GPP)), also participate in formulation of related standards to promote high-quality audio services.

Three-dimensional audio has become a new trend of audio service development because it can bring better immersive experience to users. To implement a three-dimensional audio service, an original audio signal format that needs to be compressed and coded may be classified into: a multi-channel-based audio signal format, an object-based audio signal format, a scene-based audio signal format, and a hybrid signal format of any three audio signal formats.

Regardless of which audio signal format is used, an audio signal that needs to be compressed and coded by a three-dimensional audio codec include a plurality of signals. Generally, the three-dimensional audio codec downmixes the plurality of signals through correlation between channels, to obtain a downmixed signal and a multi-channel coding parameter (generally, a quantity of channels of the downmixed signal is far less than a quantity of channels of an input signal, for example, a multi-channel signal is downmixed into a stereo signal). Then, the downmixed signal is coded by using a core coder. The stereo signal may be further downmixed into a monophonic signal and a stereo coding parameter. A quantity of bits for coding the downmixed signal and the multi-channel coding parameter is far less than a quantity of bits for independently coding an input multi-channel signal. In addition, in the core coder, to reduce a coding bit rate, correlation between signals in different frequency bands is usually further used for coding.

A principle of performing coding through the correlation between the signals in different frequency bands is to generate a high frequency band signal based on a low frequency band signal through spectral band replication or bandwidth extension, to encode the high frequency band signal by using a small quantity of bits, thereby reducing a coding bit rate of an entire coder. However, in a real audio signal, a spectrum of a high frequency band usually includes some tonal components that are dissimilar to tonal components in a spectrum of a low frequency band, and these tonal components cannot be efficiently coded and reconstructed in the conventional technology.

SUMMARY

Embodiments of this application provide a audio coding method and a related apparatus, and a computer-readable storage medium.

A first aspect of embodiments of this application provides an audio decoding method.

In an embodiment, an audio decoder obtains an encoded bitstream; performs bitstream demultiplexing on the encoded bitstream to obtain a first coding parameter of a current frame of an audio signal; performs bitstream demultiplexing on the encoded bitstream based on a configuration parameter for tonal component coding to obtain a second coding parameter of the current frame, where the second coding parameter of the current frame includes a tonal component parameter of the current frame; obtains a first high frequency band signal and a first low frequency band signal of the current frame based on the first coding parameter; obtains a second high frequency band signal of the current frame based on the second coding parameter and the configuration parameter for tonal component coding; and obtains a decoded signal of the current frame based on the first high frequency band signal, the second high frequency band signal, and the first low frequency band signal.

An audio codec in this application may be an enhanced voice service (EVS) audio codec proposed by the 3GPP, a unified speech and audio coding (USAC) audio codec, a high-efficiency advanced audio coding (HE-AAC) audio codec of a moving picture experts group (MPEG), or the like. Certainly, the audio codec in this application is not limited to the audio codecs of the foregoing example types.

In an embodiment of this application, the audio decoder may decode the encoded bitstream to obtain the tonal component parameter of the current frame, and obtain the second high frequency band signal of the current frame based on the tonal component parameter and the configuration parameter for tonal component coding. The second high frequency band signal carries information about a tonal component of a high frequency part, which helps more accurately restore the tonal component in a frequency range corresponding to the second high frequency band signal, thereby improving quality of decoding the audio signal.

In some embodiments, the audio decoding method may further include: obtaining a configuration bitstream; and performing bitstream demultiplexing on the configuration bitstream to obtain a decoder configuration parameter. The decoder configuration parameter includes the configuration parameter for tonal component coding, and the configuration parameter for tonal component coding indicates a number of tiles in which tonal component coding is performed and a subband width of each tile. For example, the configuration parameter for tonal component coding may include a tile number parameter for tonal component coding, the subband width parameter of each tile, and the like.

The configuration parameter may be obtained for each frame, or a same configuration parameter may be shared by a plurality of frames. In other words, the configuration bitstream may be obtained for each frame, or a same configuration bitstream may be shared by a plurality of frames.

When the configuration parameter may be obtained for each frame, the tile number parameter for tonal component coding in the current frame may be the same as or different from a tile number parameter for tonal component coding in a previous frame, and a subband width parameter for tonal component coding of at least one tile in the current frame may be the same as or different from a subband width parameter for tonal component coding of at least one tile of the previous frame.

When the same configuration parameter may be shared by the plurality of frames, the tile number parameter for tonal component coding in the current frame may be the same as a tile number parameter for tonal component coding in a previous frame, and a subband width parameter for tonal component coding of at least one tile in the current frame may be the same as a subband width parameter for tonal component coding of at least one tile of the previous frame (e.g., the current frame and the previous frame share a same configuration parameter).

It may be understood that, a number of tiles in which tonal component coding is performed, a subband division manner in the tiles, and the like may be flexibly configured, based on a requirement, by using the configuration parameter for tonal component coding included in the decoder configuration parameter in the configuration bitstream.

In some embodiments, performing bitstream demultiplexing on the configuration bitstream to obtain the decoder configuration parameter may include: obtaining the tile number parameter for tonal component coding and a flag parameter indicating a same subband width from the configuration bitstream, where the flag parameter indicating the same subband width indicates whether different tiles use the same subband width; and obtaining, based on the tile number parameter for tonal component coding and the flag parameter indicating the same subband width, the subband width parameter for tonal component coding in the at least one tile from the configuration bitstream.

In some embodiments, the obtaining, based on the tile number parameter for tonal component coding and the flag parameter indicating the same subband width, the subband width parameter for tonal component coding in the at least one tile from the configuration bitstream includes:

when the flag parameter indicating the same subband width is a set value S1, obtaining a shared subband width parameter (the shared subband width parameter may be shared or not shared by the current frame and other frames) from the configuration bitstream, where the subband width parameter for tonal component coding of the at least one tile is equal to the shared subband width parameter, or the subband width parameter for tonal component coding of the at least one tile is obtained through transform based on the shared subband width parameter (a transform manner may be, for example, scaling up or scaling down according to a specific proportion, or certainly may be another transform manner that meets a requirement); or when the flag parameter indicating the same subband width is a set value S2, obtaining the subband width parameter for tonal component coding in the at least one tile from the configuration bitstream (the subband width parameter for tonal component coding of the at least one tile may be shared or not shared by the current frame and other frames), where a quantity of subband width parameters for tonal component coding in the at least one tile is equal to a number of tiles in which tonal component coding is performed indicated based on the tile number parameter for tonal component coding, or a quantity of subband width parameters for tonal component coding of the at least one tile is obtained through transform based on the tile number parameter for tonal component coding. A transform manner may be, for example, scaling up or scaling down according to a specific proportion, or certainly may be another transform manner that meets a requirement.

It may be understood that, a subband width of a tile in which tonal component coding is performed may be flexibly configured, based on a requirement, by using the flag parameter indicating the same subband width.

In some embodiments, the tonal component parameter of the current frame includes one or more of the following parameters: a frame-level tonal component flag parameter of the current frame, a tile-level tonal component flag parameter of the at least one tile in the current frame, a noise floor parameter of the at least one tile in the current frame, a position-quantity information multiplexing parameter of a tonal component, a position-quantity parameter of the tonal component, and an amplitude or energy parameter of the tonal component.

In some embodiments, the configuration parameter for tonal component coding includes the tile number parameter for tonal component coding. Performing bitstream demultiplexing on the encoded bitstream based on the configuration parameter for tonal component coding to obtain the second coding parameter of the current frame of the audio signal includes: obtaining the frame-level tonal component flag parameter of the current frame from the encoded bitstream; and when the frame-level tonal component flag parameter of the current frame is a set value S3, obtaining tonal component parameters of N1 tiles in the current frame from the encoded bitstream, where N1 is equal to the number of tiles in which tonal component coding is performed in the current frame indicated based on the tile number parameter for tonal component coding in the current frame.

In some embodiments, the obtaining tonal component parameters of N1 tiles in the current frame from the encoded bitstream includes: obtaining a tile-level tonal component flag parameter of a current tile in the N1 tiles in the current frame from the encoded bitstream; and when the tile-level tonal component flag parameter of the current tile in the current frame is a set value S4, obtaining one or more of the following tonal component parameters from the encoded bitstream: a noise floor parameter, a position-quantity information multiplexing parameter of a tonal component, a position-quantity parameter of the tonal component, and an amplitude or energy parameter of the tonal component in the current tile in the current frame.

In some embodiments, the obtaining the position-quantity information multiplexing parameter of the tonal component and the position-quantity parameter of the tonal component in the current tile in the current frame from the encoded bitstream includes: obtaining the position-quantity information multiplexing parameter of the current tile in the current frame from the encoded bitstream, where when the position-quantity information multiplexing parameter of the current tile in the current frame is a set value S5, the position-quantity parameter of the tonal component in the current tile in the current frame is equal to a position-quantity parameter of a tonal component in a current tile in the previous frame of the current frame; or the position-quantity parameter of the tonal component in the current tile in the current frame is obtained through transform based on a position-quantity parameter of a tonal component in a current tile in the previous frame of the current frame; and when the position-quantity information multiplexing parameter of the current tile in the current frame is a set value S6, obtaining the position-quantity parameter of the tonal component in the current tile in the current frame from the encoded bitstream.

It may be understood that, whether position-quantity information of the tonal component is multiplexed can be conveniently controlled by using the position-quantity information multiplexing parameter of the tonal component. In addition, when the position-quantity information of the tonal component is multiplexed, a bit transmission amount is reduced, thereby reducing transmission resources.

In some embodiments, the obtaining the position-quantity parameter of the tonal component in the current tile in the current frame from the encoded bitstream includes: obtaining, based on width information and a subband width parameter for tonal component coding of the current tile in the current frame, a quantity of bits occupied by the position-quantity parameter of the tonal component in the current tile in the current frame; and obtaining the position-quantity parameter of the tonal component in the current tile in the current frame from the encoded bitstream based on the quantity of bits occupied by the position-quantity parameter of the tonal component in the current tile in the current frame.

In some embodiments, the width information of the current tile is determined by distribution of the tiles in which tonal component coding is performed, and the distribution of the tiles in which tonal component coding is performed is determined based on the tile number parameter for tonal component coding.

In some embodiments, obtaining the amplitude or energy parameter of the tonal component in the at least one tile in the current frame from the encoded bitstream includes: if the tile-level tonal component flag parameter of the current tile in the current frame is the set value S4, obtaining the amplitude or energy parameter of the tonal component in the current tile in the current frame from the encoded bitstream based on the position-quantity parameter of the tonal component in the current tile in the current frame.

A second aspect of this application provides an audio decoder, including:

an obtaining unit, configured to obtain an encoded bitstream; and a decoding unit, configured to perform bitstream demultiplexing on the encoded bitstream to obtain a first coding parameter of a current frame of an audio signal; perform bitstream demultiplexing on the encoded bitstream based on a configuration parameter for tonal component coding to obtain a second coding parameter of the current frame of the audio signal, where the second coding parameter of the current frame includes a tonal component parameter of the current frame; obtain a first high frequency band signal and a first low frequency band signal of the current frame based on the first coding parameter; obtain a second high frequency band signal of the current frame based on the second coding parameter and the configuration parameter for tonal component coding; and obtain a decoded signal of the current frame based on the first high frequency band signal, the second high frequency band signal, and the first low frequency band signal.

In some embodiments, the obtaining unit is further configured to obtain a configuration bitstream. The decoding unit is further configured to perform bitstream demultiplexing on the configuration bitstream to obtain a decoder configuration parameter. The decoder configuration parameter includes the configuration parameter for tonal component coding, and the configuration parameter for tonal component coding indicates a number of tiles in which tonal component coding is performed and a subband width of each tile.

In some embodiments, that the decoding unit performs bitstream demultiplexing on the configuration bitstream to obtain the decoder configuration parameter includes: obtaining a tile number parameter for tonal component coding and a flag parameter indicating a same subband width from the configuration bitstream, where the flag parameter indicating the same subband width indicates whether different tiles use the same subband width; and obtaining, based on the tile number parameter for tonal component coding and the flag parameter indicating the same subband width, a subband width parameter for tonal component coding in the at least one tile from the configuration bitstream.

In some embodiments, that the decoding unit obtains, based on the tile number parameter for tonal component coding and the flag parameter indicating the same subband width, the subband width parameter for tonal component coding in the at least one tile from the configuration bitstream includes:

when the flag parameter indicating the same subband width is a set value S1, obtaining a common subband width parameter from the configuration bitstream, where the subband width parameter for tonal component coding in the at least one tile is equal to the common subband width parameter, or the subband width parameter for tonal component coding in the at least one tile is obtained through transform based on the common subband width parameter; or when the flag parameter indicating the same subband width is a set value S2, obtaining the subband width parameter for tonal component coding in the at least one tile from the configuration bitstream, where a quantity of subband width parameters for tonal component coding in the at least one tile is equal to the number of tiles in which tonal component coding is performed indicated based on the tile number parameter for tonal component coding, or a quantity of subband width parameters for tonal component coding in the at least one tile is obtained through transform based on the tile number parameter for tonal component coding.

In some embodiments, the tonal component parameter of the current frame includes one or more of the following parameters: a frame-level tonal component flag parameter of the current frame, a tile-level tonal component flag parameter of the at least one tile in the current frame, a noise floor parameter of the at least one tile in the current frame, a position-quantity information multiplexing parameter of a tonal component, a position-quantity parameter of the tonal component, and an amplitude or energy parameter of the tonal component.

In some embodiments, the configuration parameter for tonal component coding includes the tile number parameter for tonal component coding. That the decoding unit performs bitstream demultiplexing on the encoded bitstream based on the configuration parameter for tonal component coding to obtain the second coding parameter of the current frame of the audio signal includes: obtaining the frame-level tonal component flag parameter of the current frame from the encoded bitstream; and when the frame-level tonal component flag parameter of the current frame is a set value S3, obtaining tonal component parameters of N1 tiles in the current frame from the encoded bitstream, where N1 is equal to the number of tiles in which tonal component coding is performed in the current frame indicated based on the tile number parameter for tonal component coding in the current frame.

In some embodiments, that the decoding unit obtains the tonal component parameters of the N1 tiles in the current frame from the encoded bitstream includes:

obtaining a tile-level tonal component flag parameter of a current tile in the N1 tiles in the current frame from the encoded bitstream; and when the tile-level tonal component flag parameter of the current tile in the current frame is a set value S4, obtaining one or more of the following tonal component parameters from the encoded bitstream: a noise floor parameter, a position-quantity information multiplexing parameter of a tonal component, a position-quantity parameter of the tonal component, and an amplitude or energy parameter of the tonal component in the current tile in the current frame.

In some embodiments, that the decoding unit obtains the position-quantity information multiplexing parameter of the tonal component and the position-quantity parameter of the tonal component in the current tile in the current frame from the encoded bitstream includes: obtaining a position-quantity information multiplexing parameter of the current tile in the current frame from the encoded bitstream, where when the position-quantity information multiplexing parameter of the current tile in the current frame is a set value S5, the position-quantity parameter of the tonal component in the current tile in the current frame is equal to a position-quantity parameter of a tonal component in a current tile in a previous frame of the current frame; or the position-quantity parameter of the tonal component in the current tile in the current frame is obtained through transform based on a position-quantity parameter of a tonal component in a current tile in a previous frame of the current frame; and when the position-quantity information multiplexing parameter of the current tile in the current frame is a set value S6, obtaining the position-quantity parameter of the tonal component in the current tile in the current frame from the encoded bitstream.

In some embodiments, that the decoding unit obtains the position-quantity parameter of the tonal component in the current tile in the current frame from the encoded bitstream includes:

obtaining, based on width information of the current tile in the current frame and the subband width parameter for tonal component coding, a quantity of bits occupied by the position-quantity parameter of the tonal component in the current tile in the current frame; and obtaining the position-quantity parameter of the tonal component in the current tile in the current frame from the encoded bitstream based on the quantity of bits occupied by the position-quantity parameter of the tonal component in the current tile in the current frame.

In some embodiments, the width information of the current tile is determined by distribution of the tiles in which tonal component coding is performed, and the distribution of the tiles in which tonal component coding is performed is determined based on the tile number parameter for tonal component coding.

In some embodiments, that the decoding unit obtains the amplitude or energy parameter of the tonal component in the at least one tile in the current frame from the encoded bitstream includes:

if the tile-level tonal component flag parameter of the current tile in the current frame is the set value S4, obtaining the amplitude or energy parameter of the tonal component in the current tile in the current frame from the encoded bitstream based on the position-quantity parameter of the tonal component in the current tile in the current frame.

A third aspect of embodiments of this application provides an audio decoder. The audio decoder may include a processor. The processor is coupled to a memory, and the memory stores a program. When the program instructions stored in the memory are executed by the processor, any method provided in the first aspect is implemented.

A fourth aspect of embodiments of this application provides a communication system, including an audio encoder and an audio decoder. The audio decoder is any audio decoder provided in embodiments of this application.

A fifth aspect of embodiments of this application provides a computer-readable storage medium, including a program. When the program is run on a computer, the computer is enabled to perform any method provided in the first aspect.

A sixth aspect of embodiments of this application provides a network device, including a processor and a memory. The processor is coupled to the memory, and is configured to read and execute instructions stored in the memory, to implement any method provided in the first aspect.

The network device is, for example, a chip or a system on chip.

A seventh aspect of embodiments of this application provides a computer-readable storage medium, where the computer-readable storage medium stores an encoded bitstream. After obtaining the encoded bitstream, any audio decoder provided in embodiments of this application obtains a decoded signal of a current frame based on the encoded bitstream.

An eighth aspect of embodiments of this application provides a computer program product. The computer program product includes a computer program. When the computer program is run on a computer, the computer is enabled to perform any method provided in the first aspect.

BRIEF DESCRIPTION OF DRAWINGS

The following briefly describes accompanying drawings used in descriptions of embodiments or a conventional technology.

FIG. 1-A and FIG. 1-B are schematic diagrams of a scenario in which an audio coding solution is applied to an audio terminal according to an embodiment of this application;

FIG. 1-C and FIG. 1-D are schematic diagrams of audio coding of a network device in a wired or wireless network according to an embodiment of this application;

FIG. 1-E is a schematic diagram of audio coding in audio communication according to an embodiment of this application;

FIG. 1-F and FIG. 1-G are schematic diagrams of multi-channel coding of a network device in a wired or wireless network according to an embodiment of this application;

FIG. 4-B is a schematic diagram of a combination of a high frequency signal and a low frequency signal according to an embodiment of this application;

FIG. 5 is a schematic diagram of an audio decoder according to an embodiment of this application;

DESCRIPTION OF EMBODIMENTS

Figure 2:
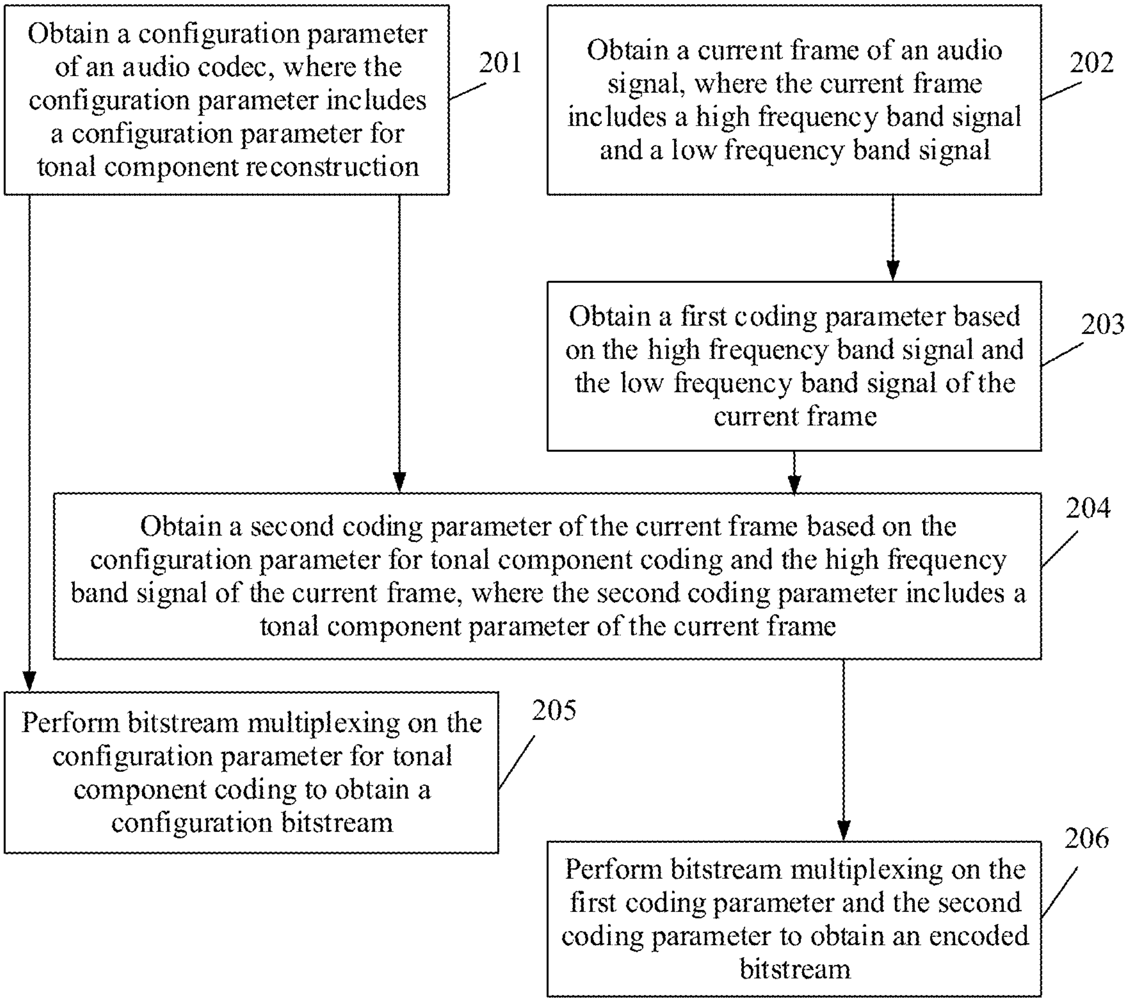
FIG. 2 is a schematic flowchart of an audio encoding method according to an embodiment of this application.

The following describes technical solutions in embodiments of this application with reference to accompanying drawings in embodiments of this application.

In the specification, claims, and accompanying drawings of this application, the terms "first", "second", and so on are intended to distinguish between different objects but do not indicate a particular order.

Refer to FIG. 1-A to FIG. 1-G. The following describes a network architecture to which an audio coding solution of this application may be applied. The audio coding solution may be applied to an audio terminal (for example, a wired or wireless communication terminal), or may be applied to a network device in a wired or wireless network.

FIG. 1-A and FIG. 1-B show a scenario in which the audio coding solution is applied to the audio terminal. A specific product form of the audio terminal may be a terminal 1, a terminal 2, or a terminal 3 in FIG. 1-A, but is not limited thereto. For example, in audio communication, an audio collector in a sending terminal may collect an audio signal, a stereo encoder may perform stereo encoding on the audio signal collected by the audio collector, a channel encoder performs channel encoding on a stereo encoded signal obtained through encoding by the stereo encoder, to obtain a bitstream, and the bitstream is transmitted over the wired network or the wireless network. Correspondingly, a channel decoder in a receiving terminal performs channel decoding on the received bitstream, and then a stereo decoder obtains a stereo signal through decoding. After that, an audio player may play audio.

Refer to FIG. 1-C and FIG. 1-D. If the network device in the wired or wireless network needs to implement transcoding, the network device may perform corresponding stereo coding processing.

Stereo coding processing may be a part of a multi-channel codec. For example, performing multi-channel encoding on a collected multi-channel signal may be: performing downmixing processing on the collected multi-channel signal to obtain a stereo signal, and encoding the obtained stereo signal. A decoder side decodes an encoded bitstream of the multi-channel signal to obtain the stereo signal, and performs upmixing processing on the stereo signal to restore the multi-channel signal. Therefore, a stereo coding solution may also be applied to a multi-channel codec in a communication module of a terminal or the network device in the wired or wireless network.

FIG. 1-E provides illustration. For example, in audio communication, an audio collector in a sending terminal may collect an audio signal, a multi-channel encoder may perform multi-channel encoding on the audio signal collected by the audio collector, a channel encoder performs channel encoding on a multi-channel encoded signal obtained through encoding by the multi-channel encoder to obtain a bitstream, and the bitstream is transmitted over the wireless network or the wireless network. Correspondingly, a channel decoder in a receiving terminal performs channel decoding on the received bitstream, and then a multi-channel decoder obtains the multi-channel signal through decoding. After that, an audio player may play audio.

Refer to FIG. 1-F and FIG. 1-G. If the network device in the wired or wireless network needs to implement transcoding, the network device may perform corresponding multi-channel coding processing.

In addition, the audio coding solution of this application may be further applicable to an audio coding (Audio Encoding/Audio Decoding) module in a virtual reality (VR streaming) service. For example, an end-to-end processing procedure of an audio signal may be: performing a preprocessing operation (Audio Preprocessing) after an acquisition (Acquisition) module obtains an audio signal A, where the preprocessing operation includes filtering out a low frequency part in the signal, generally using 20 Hz or 50 Hz as a boundary point, extracting orientation information in the signal, then performing encoding processing (Audio encoding) and encapsulation (File/Segment encapsulation), and then delivering (Delivery) a bitstream through encoding processing and encapsulation to a decoder side. Correspondingly, the decoder side first performs decapsulation, then performs decoding (Audio decoding), performs binaural rendering (Audio rendering) processing on a decoded signal, and maps a signal obtained through the rendering processing to a listener headphone. The headphone may be an independent headphone, or may be a headphone on a glasses device such as an HTC VIVE.

In an embodiment, an actual product to which the audio coding solution of this application may be applied may include a radio access network device, a media gateway of a core network, a transcoding device, a media resource server, a mobile terminal, a fixed network terminal, and the like. The audio coding solution of this application may be further applied to an audio codec in the VR streaming service.

The audio codec in this application may be an enhanced voice service (EVS) audio codec proposed by the 3GPP, a unified speech and audio coding (USAC) audio codec, a high-efficiency advanced audio coding (HE-AAC) audio codec of a moving picture experts group (MPEG), or the like. Certainly, the audio codec in this application is not limited to the audio codecs of the foregoing example types.

The following specifically describes some audio coding solutions.

FIG. 2 is a schematic flowchart of an audio encoding method according to an embodiment of this application. The audio encoding method may include the following operations.

In operation 201, a configuration parameter of an audio codec is obtained, where the configuration parameter includes a configuration parameter for tonal component coding.

In a process of tonal component coding, for example, a high frequency band of an audio frame may be divided into K tiles, where each tile may be divided into one or more subbands, and different tiles may be divided into the same, partially the same, or completely different quantities of subbands. Information about a tonal component may be obtained, for example, in a unit of a tile.

When the information about the tonal component is obtained in the unit of a tile, the configuration parameter for tonal component coding may include: a tile number parameter for tonal component coding, and may further include a subband width parameter for tonal component coding.

The subband width parameter for tonal component coding may be, for example, represented as the following two parameters: a flag parameter indicating a same subband width and a subband width parameter for tonal component coding of each tile.

The tile number parameter for tonal component coding indicates a number of tiles in a high frequency band of an audio signal in which tonal component detection, coding, and reconstruction are performed.

The flag parameter indicating the same subband width indicates whether the tiles in which tonal component coding is performed use the same subband width. In an embodiment, when the flag parameter indicating the same subband width indicates that the tiles in which tonal component coding is performed use the same subband width, the tiles in which tonal component coding is performed use the same subband width. When the flag parameter indicating the same subband width indicates that the tiles in which tonal component coding is performed use different subband widths, a part of the tiles in which tonal component coding is performed or any two tiles in which tonal component coding is performed use different subband widths.

A subband width parameter for tonal component coding of a tile in the tiles indicates frequency widths of several subbands included in the tile (this frequency width may be, for example, a quantity of frequency bins of a subband, and frequency widths of subbands in a same tile are the same).

The configuration parameter for tonal component coding may be obtained through presetting or querying of a table.

The configuration parameter may be obtained for each frame, or a same configuration parameter may be shared by a plurality of frames.

When the configuration parameter may be obtained for each frame, a tile number parameter for tonal component coding in a current frame may be the same as or different from a tile number parameter for tonal component coding in a previous frame, and a subband width parameter for tonal component coding of at least one tile in a current frame may be the same as or different from a subband width parameter for tonal component coding of at least one tile of the previous frame.

When the same configuration parameter may be shared by the plurality of frames, a tile number parameter for tonal component coding in a current frame may be the same as a tile number parameter for tonal component coding in a previous frame, and a subband width parameter for tonal component coding of at least one tile in the current frame may be the same as a subband width parameter for tonal component coding of at least one tile of the previous frame (the current frame and the previous frame share a same configuration parameter).

In operation 202, the current frame of the audio signal is obtained, where the current frame includes a high frequency band signal and a low frequency band signal.

The current frame may be any frame in the audio signal, and the current frame may include the high frequency band signal and the low frequency band signal. Division into the high frequency band signal and the low frequency band signal may be determined by using a frequency threshold. A signal higher than the frequency threshold is a high frequency band signal, and a signal lower than the frequency threshold is a low frequency band signal. The frequency threshold may be determined based on a transmission bandwidth and processing capabilities of an encoding component and a decoding component. This is not limited herein.

It may be understood that the high frequency band signal and the low frequency band signal are relative. For example, a signal lower than a frequency threshold is a low frequency band signal, and a signal higher than the frequency threshold is a high frequency band signal (a signal corresponding to the frequency threshold may be divided into either a low frequency band signal or a high frequency band signal). The frequency threshold varies with a bandwidth of the current frame. For example, when the current frame is a wideband signal with a signal bandwidth 0 kHz to 8 kHz (kHz), the frequency threshold may be 4 kHz; or when the current frame is an ultra-wideband signal with a signal bandwidth 0 kHz to 16 kHz, the frequency threshold may be 8 kHz.

It should be noted that, in an embodiment of this application, the high frequency band signal may be a part or all of signals in a high frequency area. Specifically, the high frequency area varies with a signal bandwidth of the current frame, and also varies with a frequency threshold. For example, when the signal bandwidth of the current frame is 0 kHz to 8 kHz, and the frequency threshold is 4 kHz, the high frequency area is 4 kHz to 8 kHz. In this case, the high frequency band signal may be a 4 kHz to 8 kHz signal covering the entire high frequency area, or may be a signal covering only a part of the high frequency area. For example, high frequency band signals may be in 4 kHz to 7 kHz, 5 kHz to 8 kHz, 5 kHz to 7 kHz, or 4 kHz to 6 kHz and 7 kHz to 8 kHz (that is, the high frequency band signals may be discontiguous in frequency domain). For example, when the signal bandwidth of the current frame is 0 kHz to 16 kHz, and the frequency threshold is 8 kHz, the high frequency area is 8 kHz to 16 kHz. In this case, the high frequency band signal may be an 8 kHz to 16 kHz signal covering the entire high frequency area, or may be a signal covering only a part of the high frequency area. For example, high frequency band signals may be in 8 kHz to 15 kHz, 9 kHz to 16 kHz, or 9 kHz to 15 kHz (8 kHz to 10 kHz and 11 kHz to 16 kHz, that is, the high frequency band signals may be contiguous or discontiguous in frequency domain). It may be understood that a frequency range covered by the high frequency band signal may be set based on a requirement, or may be adaptively determined based on a frequency range in which coding needs to be performed, for example, may be adaptively determined based on a frequency range in which tonal component screening needs to be performed.

In operation 203, a first coding parameter is obtained based on the high frequency band signal and the low frequency band signal of the current frame.

The first coding parameter may specifically include: a time domain noise shaping parameter, a frequency domain noise shaping parameter, a spectral quantization parameter, a bandwidth extension parameter, and the like.

In operation 204, a second coding parameter of the current frame is obtained based on the configuration parameter for tonal component coding and the high frequency band signal of the current frame, where the second coding parameter includes a tonal component parameter of the high frequency band signal of the current frame, the tonal component parameter indicates information about a tonal component of the high frequency band signal of the current frame, and the information about the tonal component includes position information, quantity information, and amplitude information or energy information of the tonal component. In some embodiments, the information about the tonal component may further include noise floor information of a tile.

Generally, a process of obtaining the second coding parameter of the current frame based on the high frequency band signal is performed based on division into tiles and/or division into subbands of a high frequency band. The high frequency band corresponding to the high frequency band signal may include at least one tile, and one tile may include at least one subband.

In the configuration parameter for tonal component coding, the tile number parameter for tonal component coding indicates tile number information for tonal component coding in the high frequency band corresponding to the high frequency band signal. For example, if the tile number parameter for tonal component coding is 3, it indicates that tonal component coding is performed in three tiles in the high frequency band corresponding to the high frequency band signal. The three tiles may be specified three tiles in all tiles of the high frequency band, or selected from all tiles of the high frequency band according to a preset rule.

In the configuration parameter for tonal component coding, the flag parameter indicating the same subband width and the subband width parameter for tonal component coding of each tile indicate width information of a subband in each tile in which tonal component coding is performed (that is, the quantity of frequency bins included in the subband). In a tonal component encoding method provided in this embodiment of this application, information about a maximum of one tonal component is encoded in each subband of each tile. Therefore, a subband width parameter for tonal component coding in a tile determines a maximum quantity of tonal components that can be encoded in the tile.

In operation 205, bitstream multiplexing is performed on the configuration parameter for tonal component coding to obtain a configuration bitstream.

The configuration parameter may be obtained for each frame, or the same configuration parameter may be shared by the plurality of frames (in other words, the configuration bitstream may be obtained for each frame, or a same configuration bitstream may be shared by a plurality of frames). Therefore, the configuration bitstream may be generated for each frame, or a configuration bitstream shared by the plurality of frames is generated for the plurality of frames.

It may be understood that, when the plurality of frames share the same configuration parameter (in other words, the plurality of frames share the same configuration bitstream), if the current frame and another frame share a same configuration parameter, a configuration parameter for tonal component coding of the previous frame may also be referred to as a configuration parameter for tonal component coding of the current frame, and a configuration parameter for tonal component coding of the current frame may also be referred to as a configuration parameter for tonal component coding of the previous frame.

In operation 206, bitstream multiplexing is performed on the first coding parameter and the second coding parameter to obtain an encoded bitstream.

It can be learned that, because the second coding parameter includes the tonal component parameter of the high frequency band signal of the current frame, and the tonal component parameter indicates the information about the tonal component of the high frequency band signal of the current frame, an audio decoder may decode the encoded bitstream to obtain a tonal component parameter of the current frame, and may further obtain a second high frequency band signal of the current frame based on the tonal component parameter and the configuration parameter for tonal component coding. The second high frequency band signal carries information about a tonal component of a high frequency part, which helps more accurately restore the tonal component in a frequency range corresponding to the second high frequency band signal, thereby improving quality of decoding the audio signal.

Figure 3:
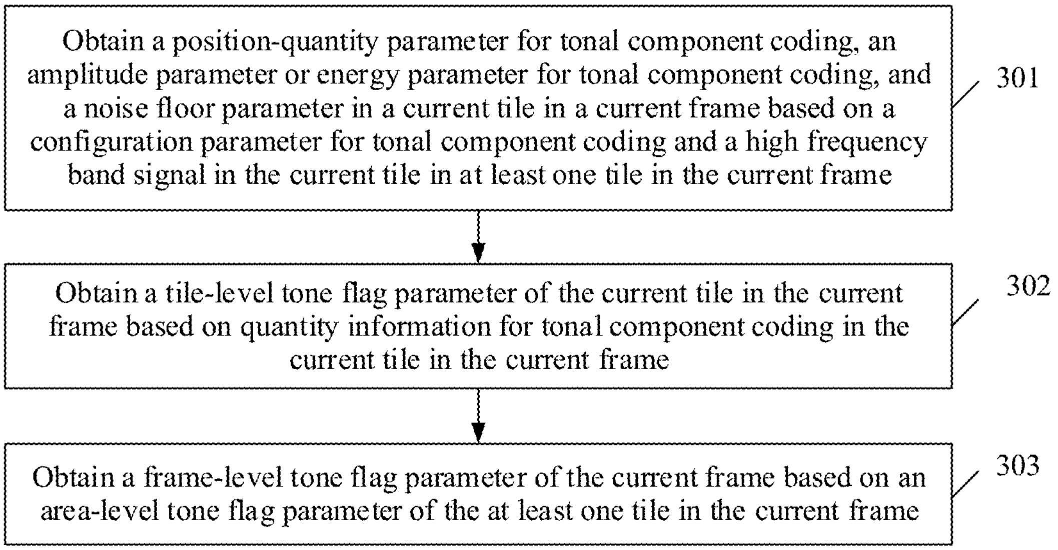
FIG. 3 is a schematic flowchart of a method for obtaining a second coding parameter of a current frame according to an embodiment of this application.

FIG. 3 is a schematic flowchart of a method for obtaining a second coding parameter of a current frame according to an embodiment of this application.

The method for obtaining the second coding parameter of the current frame may include the following operations.

In operation 301, a noise floor parameter, a position-quantity parameter of a tonal component, and an amplitude or energy parameter of the tonal component in a current tile in the current frame are obtained based on a configuration parameter for tonal component coding and a high frequency band signal in the current tile in at least one tile in the current frame.

Quantity information of a tonal component, position information of the tonal component, amplitude information or energy information of the tonal component, and noise floor information in each tile may be separately obtained based on a tile number parameter for tonal component coding, a subband width parameter of each tile, and the high frequency band signal of the current tile in the at least one tile in the current frame.

A position-quantity parameter of the tonal component, an amplitude or energy parameter of the tonal component, and a noise floor parameter in each tile are obtained based on the quantity information of the tonal component, the position information of the tonal component, the amplitude or energy information of the tonal component, and the noise floor information in each tile.

The position-quantity parameter of the tonal component may further include a position-quantity information multiplexing parameter. For example, a method for determining the parameter is: if the position-quantity parameter of the tonal component in the current tile in the at least one tile in the current frame is the same as a position-quantity parameter of a tonal component in a current tile of a previous frame of the current frame, the position-quantity information multiplexing parameter of the current tile in the current frame may be set to S5. Otherwise, the position-quantity information multiplexing parameter of the current tile in the current frame is set to S6. S5 is not equal to S6. For example, S5=1 and S6=0, or S5=0 and S6=1.

A specific method for determining, based on the high frequency band signal of the current tile, the noise floor parameter of the current tile, the position-quantity parameter of the tonal component in the current tile, and the amplitude parameter or the energy parameter of the tonal component in the current tile. This is not limited in this application.

In operation 302, a tile-level tonal component flag parameter of the current tile in the current frame is obtained based on quantity information of the tonal component in the current tile in the current frame.

For example, if the quantity information of the tonal component in the current tile in the current frame is greater than zero, the tile-level tonal component flag parameter of the current tile is set to S4. Otherwise, the tile-level tonal component flag parameter of the current tile is set to S8. S4 is not equal to S8. For example, S4=1 and S8=0, or S4=0 and S8=1.

In operation 303, a frame-level tonal component flag parameter of the current frame is obtained based on a tile-level tonal component flag parameter of the at least one tile in the current frame.

For example, if the tile-level tonal component flag parameter of the at least one tile in the current frame is not S8, the frame-level tonal component flag parameter of the current frame is set to S3. Otherwise, the frame-level tonal component flag parameter of the current frame is set to S7. S3 is not equal to S7. For example, S3=1 and S7=0, or S3=0 and S7=1.

The following provides examples of specific parameters that may be included in the configuration parameter for tonal component coding. For example, the configuration parameter for tonal component coding may include:

a. tile number parameter for tonal component coding, which may be denoted as num_tiles_recon;
b. flag parameter indicating a same subband width, which may be denoted as flag_same_res, and indicates whether different tiles use the same subband width; and
c. subband width parameter for tonal component coding of each tile, which may be denoted as tone_res[N1], and N1 is a number of tiles in which tonal component coding is performed.

The following describes a manner of generating a bitstream of the configuration parameter for tonal component coding by using an example (it is assumed that the tiles use the same subband width, in other words, the flag parameter flag_same_res indicating the same subband width is S1):

```
extentElementConfigLength = 1
extentElementConfigPayload[0] = (num_tiles_recon - 1) << 5
flag_same_res = 1
extentElementConfigPayload[0] += (flag_same_res) << 4
tone_res_common = tone_res[0]
extentElementConfigPayload[0] += (tone_res_common/8 - 1) << 2
```

extentElementConfigLength indicates a configuration bitstream length for tonal component coding (quantity of bytes).

extentElementConfigPayload indicates a configuration bitstream array for tonal component coding, and tone_res_common indicates a common subband width parameter of each tile.

For example, in a configuration bitstream generation manner, the tile number parameter num_tiles_recon for tonal component coding may occupy, for example, 3 bits or another quantity of bits, the flag parameter flag_same_res indicating the same subband width may occupy 1 bit or another quantity of bits, and the common subband width parameter tone_res_common may occupy 2 bits or another quantity of bits.

The following provides examples of specific parameters that may be included in an encoded bitstream parameter for tonal component coding. For example, the encoded bitstream parameter for tonal component coding may include:

a. frame-level tonal component flag parameter, which may be denoted as tone_flag;
b. tile-level tonal component flag parameter of each tile, which may be denoted as tone_flag_tile;
c. position-quantity parameter of the tonal component in each tile, which may be denoted as tone_pos;
d. position-quantity information multiplexing parameter of the tonal component in each tile, which may be denoted as is_same_pos;
e. amplitude or energy parameter of the tonal component in each tile, which may be denoted as tone_val_q; and
f. noise floor parameter of each tile, which may be denoted as noise floor.

A possible generation manner of an encoded bitstream for tonal component coding is described as follows:

If the frame-level tonal component flag parameter tone_flag of the current frame is S7, that is, the current frame does not have the tonal component, the frame-level tonal component flag parameter tone_flag of the current frame is written into a bitstream, and other parameters are not written into the encoded bitstream for tonal component coding of the current frame. To be specific, if the current frame does not have the tonal component (tone_flag is equal to S7), the encoded bitstream for tonal component coding of the current frame includes only the frame-level tonal component flag parameter tone_flag of the current frame.

If the frame-level tonal component flag parameter tone_flag of the current frame is S3, that is, the current frame has the tonal component, the frame-level tonal component flag parameter tone_flag of the current frame is written into a bitstream, and then tonal component parameters of the tiles are written into the bitstream in sequence, where a quantity of the tiles is equal to the tile number parameter num_tiles_recon for tonal component coding.

For the current tile in the at least one tile in the current frame, if the tile-level tonal component flag parameter tone_flag_tile[p] (p is a tile index) of the current tile is S8, that is, no tonal component exists in the current tile, the tile-level tonal component flag parameter tone_flag_tile[p] of the current tile is written into a bitstream, and other parameters are not written into the current tile. If the tile-level tonal component flag parameter tone_flag_tile[p] of the current tile is S4, that is, the tonal component exists in the current tile, the tile-level tonal component flag parameter tone_flag_tile[p] of the current tile is written into a bitstream, and then other parameters of the current tile (including the position-quantity information multiplexing parameter, the position-quantity parameter, the amplitude or energy parameter, and the noise floor parameter) are written into the bitstream in sequence.

A manner of writing the position-quantity information multiplexing parameter and the position-quantity parameter into the bitstream is: if the position-quantity information multiplexing parameter is_same_pos[p] of the current tile (p is a tile index) is S6, that is, the current tile in the current frame does not multiplex the position-quantity parameter of the previous frame of the current frame, the position-quantity information multiplexing parameter is_same_pos[p] and the position-quantity parameter tone_pos[p] are written into the bitstream. If the position-quantity information multiplexing parameter is_same_pos[p] of the current tile is S5, that is, the current tile in the current frame multiplexes the position-quantity parameter of the current tile of the previous frame, only the position-quantity information multiplexing parameter is_same_pos[p] is written into the bitstream.

A manner of writing the amplitude or energy parameter into the bitstream is: writing an amplitude or energy parameter of each tonal component in the current tile into the bitstream based on the quantity information of the tonal component tone_cnt[p] of the current tile.

A manner of writing the noise floor parameter into the bitstream is: writing the noise floor parameter of the current tile into the bitstream.

A possible generation manner of the encoded bitstream for tonal component coding may be shown in the following pseudocode:

```
if tone_flag == 0
   BsPutBit(0)                                   frame-level tonal component flag
parameter = 0
else
   BsPutBit(1)                                   frame-level tonal component flag
parameter = 1
   for p = 0 to num_tiles_recon - 1
      if tone_flag_tile[p] == 0
         BsPutBit(0)                             tile-level tonal component flag
parameter = 0
      else
         BsPutBit(1)                             tile-level tonal component flag
parameter = 1
         if is_same_pos[p] == 0
            BsPutBit(0)                          position-quantity information
multiplexing parameter = 0
            BsPutBit(tone_pos[p], num_subband)   position-quantity parameter
         else
            BsPutBit(1)                          position-quantity information multiplexing parameter
= 1
         end
         for i = 0 to tone_cnt[p] - 1
            BsPutBit(tone_val_q[p][i], 7)        amplitude or energy parameter
         end
         BsPutBit(noise_floor[p], 4)             noise floor parameter
      end
   end
end
```

BsPutBit(m) indicates writing m bits into the encoded bitstream, and num_subband indicates a quantity of subbands in the tile. For example, num_subband may be determined based on a width and a subband width parameter for tonal component coding of the current tile.

tone_cnt[p] indicates the quantity information of the tonal component in the tile. For example, tone_cnt[p] may be obtained based on the position-quantity parameter of the tonal component.

It can be learned from the foregoing that in a solution of this embodiment of this application, an audio encoder determines tile information for tonal component coding, and encodes information about a tonal component in a frequency range corresponding to the information about the tile, so that an audio decoder can decode an audio signal based on the received information about the tonal component. This helps more accurately restore the tonal component in the audio signal in the frequency range corresponding to the information about the tile, thereby improving quality of decoding the audio signal.

Figure 4:
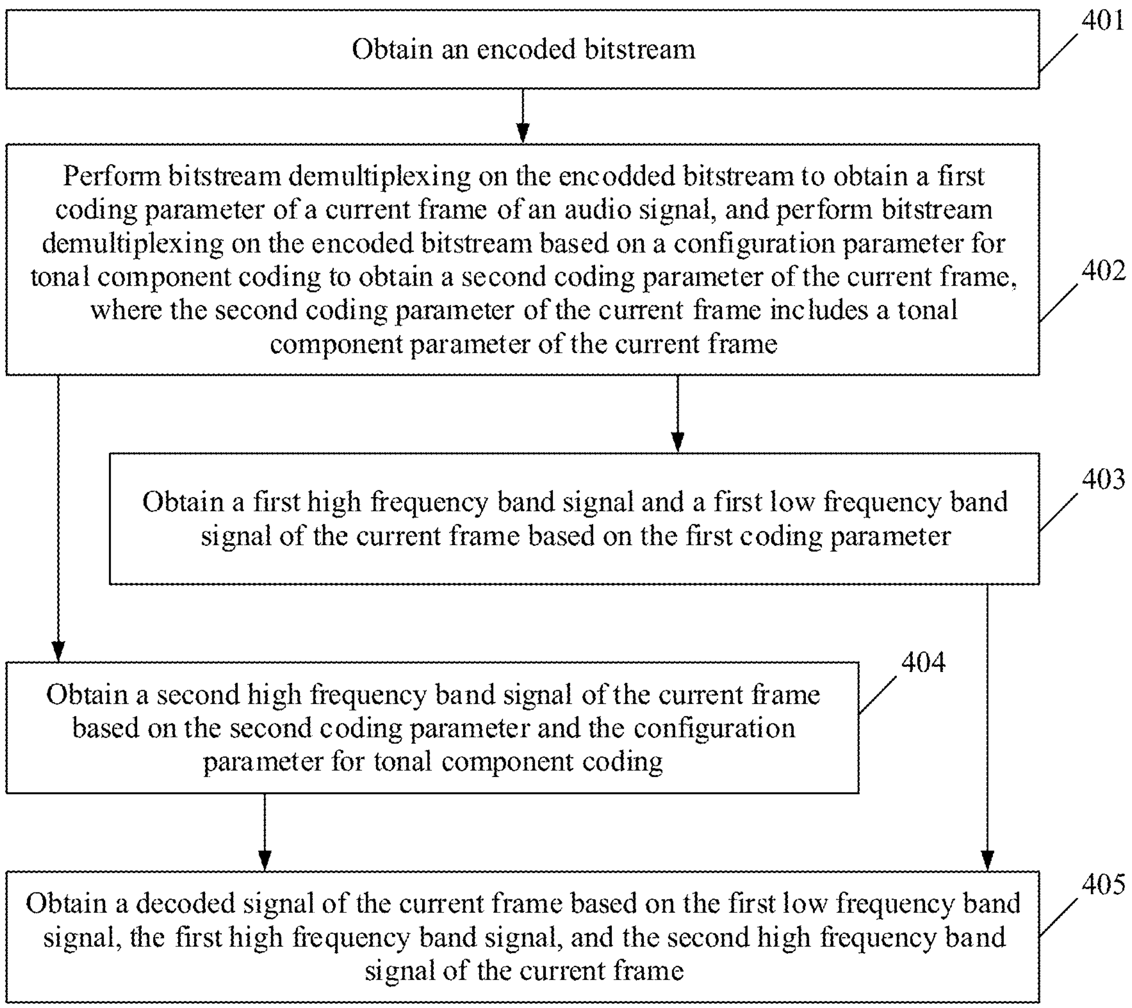
FIG. 4-A is a schematic flowchart of an audio decoding method according to an embodiment of this application.

FIG. 4-A is a schematic flowchart of an audio decoding method according to an embodiment of this application. The audio decoding method may include the following operations.

In operation 401, an encoded bitstream is obtained.

Before the encoded bitstream is obtained, an audio decoder may first obtain a configuration bitstream. For a case in which the configuration bitstream may be obtained for each frame, or a case in which a plurality of frames share the configuration bitstream, a configuration bitstream may be obtained once every several frames (an interval for obtaining the configuration bitstream may be adjusted adaptively), or a configuration bitstream may be obtained once only when the audio decoder receives a first frame of encoded bitstream.

The audio decoder performs bitstream demultiplexing on the configuration bitstream to obtain a decoder configuration parameter. The decoder configuration parameter includes a configuration parameter for tonal component coding, and the configuration parameter for tonal component coding may indicate a number of tiles in which tonal component coding is performed, a subband width of each tile, and the like. The configuration parameter for tonal component coding may be used to reconstruct a tonal component.

For example, the configuration parameter for tonal component coding may include:

a. tile number parameter for tonal component coding, which may be denoted as num_tiles_recon;
b. flag parameter indicating a same subband width, which may be denoted as flag_same_res, and indicates whether different tiles use the same subband width; and
c. subband width parameter for tonal component coding of each tile, which may be denoted as tone_res[N1], and N1 is the number of tiles.

For example, a specific manner of parsing the configuration bitstream may be described as the following process:

The tile number parameter for tonal component coding is obtained. For example, the tile number parameter for tonal component coding occupies 3 bits:

num_tiles_recon=GetBits(3)+1, where

GetBits indicates a process of obtaining several bits from a bitstream.

The flag parameter flag_same_res indicating the same subband width is obtained. For example, the flag parameter indicating the same subband width occupies 1 bit:

flag_same_res=GetBits(1)

The subband width parameter tone_res[N1] for tonal component coding of each tile is parsed from the configuration bitstream based on a value of the flag parameter flag_same_res indicating the same subband width. For example, the subband width parameter of each tile occupies 2 bits:

```
if flag_same_res == 0
   for i = 0 to num_tiles_recon - 1
      tone_res[i] = GetBits(2)
      tone_res[i] = (tone_res[i]+1)*8
   end
else
   tone_res_common = GetBits(2)
   tone_res_common = (tone_res_common+1)*8
   for i = 0 to num tiles recon - 1
```

-continued

```
        tone_res[i] = tone_res_common
    end
end
```

A process of demultiplexing the configuration bitstream may be described as follows:

If a value of the flag parameter flag_same_res indicating the same subband width is S2, to be specific, subband width parameters of the tiles in which tonal component coding is performed are not completely the same, the subband width parameter tone_res[N1] for tonal component coding of num_tiles_recon tiles is obtained from the configuration bitstream based on the tile number parameter num_tiles_recon for tonal component coding.

If a value of the flag parameter flag_same_res indicating the same subband width is S1, to be specific, subband width parameters of the tiles in which tonal component coding is performed are the same, a common subband width parameter tone_res_common is obtained from the configuration bitstream, and the common subband width parameter tone_res_common is assigned to a subband width parameter tone_res[i] for tonal component coding of each tile. The number of tiles is equal to the tile number parameter num_tiles_recon for tonal component coding.

It may be understood that, in the foregoing example process, an example in which the tile number parameter for tonal component coding occupies 3 bits, the flag parameter indicating the same subband width occupies 1 bit, and the subband width parameter for tonal component coding of each tile occupies 2 bits is used, and a case of another quantity of bits may be deduced by analogy.

In operation 402, bitstream demultiplexing is performed on the encoded bitstream to obtain a first coding parameter of a current frame of an audio signal, and perform bitstream demultiplexing on the encoded bitstream based on the configuration parameter for tonal component coding to obtain a second coding parameter of the current frame, where the second coding parameter of the current frame includes a tonal component parameter of the current frame.

For specific content of the first coding parameter and the second coding parameter, refer to the encoding method illustrated in the foregoing embodiment. Details are not described herein again.

Performing bitstream demultiplexing on the encoded bitstream includes: performing bitstream demultiplexing on the encoded bitstream based on the configuration parameter for tonal component coding to obtain the second coding parameter of the current frame of the audio signal, where the second coding parameter includes the tonal component parameter of the current frame.

For example, a coding parameter for tonal component coding may include one or more of the following parameters:

a. frame-level tonal component flag parameter, which is denoted as tone_flag;
b. tile-level tonal component flag parameter of each tile, which is denoted as tone_flag_tile;
c. position-quantity parameter of a tonal component in each tile, which is denoted as tone_pos;
d. position-quantity information multiplexing parameter of the tonal component in each tile, which is denoted as is_same_pos;
e. amplitude or energy parameter of the tonal component in each tile, which is denoted as tone_val_q; and
f. noise floor parameter of each tile, which is denoted as noise_floor.

A method for parsing the encoded bitstream may be described as follows. The frame-level tonal component flag parameter tone_flag of the current frame is obtained from the encoded bitstream. If the frame-level tonal component flag parameter of the current frame is S7, it indicates that the current frame does not have the tonal component, and another coding parameter does not need to be obtained from the encoded bitstream. If the frame-level tonal component flag parameter of the current frame is S3, it indicates that the current frame has the tonal component, and a tonal component parameter and the noise floor parameter of each tile need to be obtained from the encoded bitstream. The number of tiles is equal to the tile number parameter num_tiles_recon for tonal component coding.

For a current tile in at least one tile in the current frame, a tile-level tonal component flag parameter tone_flag_tile[p] (p is a tile index) of the current tile is obtained from the encoded bitstream. If the tile-level tonal component flag parameter of the current tile is S8, it indicates that no tonal component exists in the current tile, and the another coding parameter does not need to be obtained from the encoded bitstream. In addition, if the tile-level tonal component flag parameter of the current tile is S4, it indicates that the tonal component exists in the current tile. A position-quantity information multiplexing parameter, a position-quantity parameter, and an amplitude or energy parameter of a tonal component in the current tile, and a noise floor parameter in the current tile need to be obtained from the encoded bitstream.

A method for obtaining the position-quantity information multiplexing parameter and the position-quantity parameter of the current tile is: obtaining the position-quantity information multiplexing parameter is_same_pos[p] of the current tile from the encoded bitstream; and if the position-quantity information multiplexing parameter of the current tile is S6, obtaining the position-quantity parameter tone_pos[p] of the tonal component in the current tile from the encoded bitstream based on a quantity of bits occupied by the position-quantity parameter of the tonal component in the current tile. The quantity of bits occupied by the position-quantity parameter of the tonal component in the current tile is determined by width information of the current tile and a subband width parameter for tonal component coding tone_res[p] of the current tile. The width information of the current tile is determined by distribution of the tiles in which tonal component coding is performed, and the distribution of the tiles in which tonal component coding is performed is determined based on the tile number parameter for tonal component coding. If the position-quantity information multiplexing parameter of the current tile is S5, the position-quantity parameter of the tonal component in the current tile in the current frame is equal to a position-quantity parameter of a tonal component in a current tile of a previous frame of the current frame.

A method for obtaining the amplitude or energy parameter of the tonal component in the current tile may be: obtaining an amplitude or energy parameter of each tonal component in the current tile from the encoded bitstream based on quantity information of the tonal component in the current tile. The quantity information of the tonal component in the current tile may be obtained based on the position-quantity parameter of the tonal component in the current tile.

A method for obtaining the noise floor parameter of the current tile may be, for example, obtaining the noise floor parameter of the current tile from the encoded bitstream.

An example method for parsing the encoded bitstream may be described as the following pseudocode:

```
//frame-level tonal component flag, occupying 1 bit
tone_flag = GetBits(l)
if tone_flag == 1
  for p = 0 to num_tiles_recon - 1
    //tile-level tonal component flag, occupying 1 bit
    tone_flag_tile[p] = GetBits(1)
    if tone_flag_tile[p] == 1
        //position-quantity information multiplexing parameter, occupying 1 bit
      is_same_pos[p] = GetBits(1)
        //calculate a number of subbands (num_subband) in the current tile
      tile_width = tile[p+1] - tile[p]
        num_subband = tile_width/tone_res[p]
        //position-quantity parameter, occupying num_subband bits
      if is_same_pos[p] == 0
          tone _pos[p] = GetBits(num_subband)
          //update a position-quantity parameter history
          last_tone_pos[p] = tone_pos[p]
        else
          tone _pos[p] = last_tone_pos[p]
        end
        //obtain the quantity information of the tonal component
      tone_cnt[p] = 0
        for i = 0 to num subband - 1
          tmp = tone_pos[p] >> 1
          if tmp & 0x01 == 1
            tone_cnt[p]++
          end
        end
        //amplitude or energy parameter, occupying 7 bits
      for i = 0 to tone_cnt[p] - 1
          tone_val_q[p][i] = GetBits(7)
        end
        //noise floor parameter, occupying 4 bits
      noise_floor[p] = GetBits(4)
    end
  end
end
```

tile width is a width (that is, a quantity of frequency bins) of the current tile, and tile[p] and tile[p+1] are start frequency bin indexes of a $p^{th}$ tile and a (p+1)th tile respectively.

In operation 403, a first high frequency band signal of the current frame and a first low frequency band signal of the current frame are obtained based on the first coding parameter.

The first high frequency band signal may include a decoded high frequency band signal obtained through direct decoding based on the first coding parameter, and/or an extended high frequency band signal obtained through bandwidth extension based on the first low frequency band signal.

In operation 404, a second high frequency band signal of the current frame is obtained based on the second coding parameter and the configuration parameter for tonal component coding, where the second high frequency band signal includes a reconstructed tonal signal.

The second coding parameter may include a tonal component parameter of the high frequency band signal. The tonal component parameter of the high frequency band signal may include a position-quantity parameter of a tonal component in each tile, an amplitude or energy parameter of the tonal component, and a noise floor parameter.

Obtaining a second high frequency band signal of the current frame based on the second coding parameter, where the second high frequency band signal includes a reconstructed tonal signal may include: determining the distribution of the tiles in which tonal component coding is performed based on the tile number parameter for tonal component coding; and reconstructing the tonal component based on the tonal component parameter of the high frequency band signal in the tiles in which tonal component coding is performed.

For example, determining boundaries of the tiles in which tonal component coding is performed based on the number of tiles in which tonal component coding is performed specifically includes: if the number of tiles in which tonal component coding is performed is less than or equal to a number of tiles in which bandwidth extension is performed corresponding to bandwidth extension information, the boundaries of the tiles in which tonal component coding is performed is the same as boundaries of the tiles in which bandwidth extension is performed. The boundary of the tile may be, for example, an upper limit of the tile and/or a lower limit of the tile.

In an embodiment, if the number of tiles in which tonal component coding is performed is greater than the number of tiles in which bandwidth extension is performed, in the tiles in which tonal component coding is performed, boundaries of several tiles whose frequencies are less than a bandwidth extension upper limit are the same as the boundaries of the tiles in which bandwidth extension is performed, and boundaries of several tiles whose frequencies are greater than the bandwidth extension upper limit may be determined based on a frequency band division manner.

A specific manner of determining the boundaries of several tiles whose frequencies are greater than the bandwidth extension upper limit based on the frequency band division manner may be:

A frequency lower limit of a tile in the several tiles whose frequencies are greater than the bandwidth extension upper limit is equal to a frequency upper limit of a tile that is adjacent to the tile and whose frequency is lower, and a frequency upper limit thereof is determined based on a subband division manner. The tile meets, for example, the following two conditions. A condition T1 is, for example, that the frequency upper limit of the tile is less than or equal to half of a sampling frequency, and a condition T2 is, for example, that a width of the tile is less than or equal to a preset value. The width of the tile is a difference between the frequency upper limit of the tile and the frequency lower limit of the tile.

For example, a lower limit of a first frequency range for tonal component coding is the same as a lower limit of a second frequency range for bandwidth extension. When the number of tiles in which tonal component coding is performed is less than or equal to the number of tiles in which bandwidth extension is performed, distribution of a tile in the first frequency range is the same as distribution of a tile in the second frequency range indicated in bandwidth extension configuration information, in other words, a division manner of the tile in the first frequency range is the same as a division manner of the tile in the second frequency range. When the number of tiles in which tonal component coding is performed is greater than the number of tiles in which bandwidth extension is performed, a frequency upper limit of the first frequency range is greater than a frequency upper limit of the second frequency range, in other words, the first frequency range covers and is greater than the second frequency range. Distribution of a tile in an overlapping part of the first frequency range and the second frequency range is the same as distribution of the tile in the second frequency range. In other words, a division manner of the tile in the overlapping part of the first frequency range and the second frequency range is the same as the division manner of the tile in the second frequency range. Distribution of a tile in a non-overlapping part of the first frequency range and the second frequency range is determined in a preset manner. In other words, the tile in the non-overlapping part of the first frequency range and the second frequency range is divided in the preset manner.

Specifically, for example, a decoder side obtains the tile number parameter num_tiles_recon for tonal component coding from the configuration bitstream.

If num_tiles_recon is greater than the number of tiles in which bandwidth extension is performed, a frequency boundary of a newly added tile and correspondence between the frequency boundary of the newly added tile and an SFB are obtained. A specific manner is the same as that of an encoder side, in other words, the frequency boundary of the newly added tile is as close to a full band Fs/2 as possible on the premise that a width of the newly added tile does not exceed a given value.

A manner of determining the frequency boundary of the newly added tile and an SFB index of the boundary of the tile is the same as that of the encoder side. A tile division table and a tile-SFB correspondence table are updated as follows:

tile[num_tiles_recon]=sfb_offset[sfbIdx]

tile_sfb_wrap[num_tiles_recon]=sfbIdx sfbIdx indicates an SFB index corresponding to an upper boundary of the newly added tile, and sfb_offset indicates an SFB boundary table. A lower limit of an $i^{th}$ SFB is sfb_offset [i], and an upper limit is sfb_offset[i+1].

Reconstructing a tonal component based on information about the tonal component of the high frequency band signal may specifically include: determining a frequency position of the tonal component in the current tile based on a position-quantity parameter of the tonal component in the current tile; determining, based on an amplitude parameter or an energy parameter of the tonal component in the current tile, an amplitude or energy corresponding to the frequency position of the tonal component; and obtaining a reconstructed high frequency band signal based on the frequency position of the tonal component in the current tile and the amplitude or energy corresponding to the frequency position of the tonal component.

In operation 405, a decoded signal of the current frame is obtained based on the first low frequency band signal, the first high frequency band signal, and the second high frequency band signal of the current frame.

In an embodiment, the first low frequency band signal, the first high frequency band signal, and the second high frequency band signal of the current frame are combined to obtain the decoded signal of the current frame. A combination manner may be superposition, weighted superposition, or the like. FIG. 4-B shows an example of a possible manner of performing superposition and combination on the first low frequency band signal, the first high frequency band signal, and the second high frequency band signal to obtain the decoded signal of the current frame.

According to a high frequency band tonal component coding solution illustrated in this embodiment of this application, information about a tile in which tonal component detection and encoding need to be performed is determined, and information about a tonal component in a frequency range corresponding to the information about the tile is encoded, so that the audio decoder can decode the audio signal based on the received information about the tonal component. This helps more accurately restore the tonal component in the audio signal in the frequency range corresponding to the information about the tile, thereby improving quality of decoding the audio signal.

When a frequency range covered by bandwidth extension processing may not reach a maximum bandwidth, the foregoing example solution is used to facilitate encoding of a tonal component of a high frequency band in a frequency range not covered by bandwidth extension processing. When the frequency range covered by bandwidth extension processing is large, and there are not enough coding bits to encode information about all tonal components of the frequency range covered by bandwidth extension processing, information about a tonal component in a part of the frequency range may be selectively encoded. Experiments show that best encoding quality can be obtained under different conditions.

Refer to FIG. 5. An embodiment of this application further provides an audio decoder 500, including:

- an obtaining unit 510, configured to obtain an encoded bitstream; and
- a decoding unit 520, configured to perform bitstream demultiplexing on the encoded bitstream to obtain a first coding parameter of a current frame of an audio signal; perform bitstream demultiplexing on the encoded bitstream based on a configuration parameter for tonal component coding to obtain a second coding parameter of the current frame of the audio signal, where the second coding parameter of the current frame includes a tonal component parameter of the current frame; obtain a first high frequency band signal and a first low frequency band signal of the current frame based on the first coding parameter; obtain a second high frequency band signal of the current frame based on the second coding parameter and the configuration parameter for tonal component coding; and obtain a decoded signal of the current frame based on the first high frequency band signal, the second high frequency band signal, and the first low frequency band signal.

In some embodiments, the obtaining unit 510 is further configured to obtain a configuration bitstream. The decoding unit 520 is further configured to perform bitstream demultiplexing on the configuration bitstream to obtain a decoder configuration parameter. The decoder configuration parameter includes the configuration parameter for tonal component coding, and the configuration parameter for tonal component coding indicates a number of tiles in which tonal component coding is performed and a subband width of each tile.

In some embodiments, that the decoding unit 520 performs bitstream demultiplexing on the configuration bitstream to obtain the decoder configuration parameter includes: obtaining a tile number parameter for tonal component coding and a flag parameter indicating a same subband width from the configuration bitstream, where the flag parameter indicating the same subband width indicates whether different tiles use the same subband width; and obtaining, based on the tile number parameter for tonal component coding and the flag parameter indicating the same subband width, a subband width parameter for tonal component coding in the at least one tile from the configuration bitstream.

In some embodiments, that the decoding unit 520 obtains, based on the tile number parameter for tonal component coding and the flag parameter indicating the same subband width, the subband width parameter for tonal component coding in the at least one tile from the configuration bitstream includes:

when the flag parameter indicating the same subband width is a set value S1, obtaining a common subband width parameter from the configuration bitstream, where the subband width parameter for tonal component coding in the at least one tile is equal to the common subband width parameter, or the subband width parameter for tonal component coding in the at least one tile is obtained through transform based on the common subband width parameter; or when the flag parameter indicating the same subband width is a set value S2, obtaining the subband width parameter for tonal component coding in the at least one tile from the configuration bitstream, where a quantity of subband width parameters for tonal component coding in the at least one tile is equal to the number of tiles in which tonal component coding is performed indicated based on the tile number parameter for tonal component coding, or a quantity of subband width parameters for tonal component coding in the at least one tile is obtained through transform based on the tile number parameter for tonal component coding.

In some embodiments, the tonal component parameter of the current frame includes one or more of the following parameters: a frame-level tonal component flag parameter of the current frame, a tile-level tonal component flag parameter of the at least one tile in the current frame, a noise floor parameter of the at least one tile in the current frame, a position-quantity information multiplexing parameter of a tonal component, a position-quantity parameter of the tonal component, and an amplitude or energy parameter of the tonal component.

In some embodiments, the configuration parameter for tonal component coding includes the tile number parameter for tonal component coding. That the decoding unit 520 performs bitstream demultiplexing on the encoded bitstream based on the configuration parameter for tonal component coding to obtain the second coding parameter of the current frame of the audio signal includes: obtaining the frame-level tonal component flag parameter of the current frame from the encoded bitstream; and when the frame-level tonal component flag parameter of the current frame is a set value S3, obtaining tonal component parameters of N1 tiles in the current frame from the encoded bitstream, where N1 is equal to the number of tiles in which tonal component coding is performed in the current frame indicated based on the tile number parameter for tonal component coding in the current frame.

In some embodiments, that the decoding unit 520 obtains the tonal component parameters of the N1 tiles in the current frame from the encoded bitstream includes:

obtaining a tile-level tonal component flag parameter of a current tile in the N1 tiles in the current frame from the encoded bitstream; and when the tile-level tonal component flag parameter of the current tile in the current frame is a set value S4, obtaining one or more of the following tonal component parameters from the encoded bitstream: a noise floor parameter, a position-quantity information multiplexing parameter of a tonal component, a position-quantity parameter of the tonal component, and an amplitude or energy parameter of the tonal component in the current tile in the current frame.

In some embodiments, that the decoding unit 520 obtains the position-quantity information multiplexing parameter of the tonal component and the position-quantity parameter of the tonal component in the current tile in the current frame from the encoded bitstream includes: obtaining a position-quantity information multiplexing parameter of the current tile in the current frame from the encoded bitstream, where when the position-quantity information multiplexing parameter of the current tile in the current frame is a set value S5, the position-quantity parameter of the tonal component in the current tile in the current frame is equal to a position-quantity parameter of a tonal component in a current tile in a previous frame of the current frame; or the position-quantity parameter of the tonal component in the current tile in the current frame is obtained through transform based on a position-quantity parameter of a tonal component in a current tile in a previous frame of the current frame; and when the position-quantity information multiplexing parameter of the current tile in the current frame is a set value S6, obtaining the position-quantity parameter of the tonal component in the current tile in the current frame from the encoded bitstream.

In some embodiments, that the decoding unit 520 obtains the position-quantity parameter of the tonal component in the current tile in the current frame from the encoded bitstream includes:

obtaining, based on width information of the current tile in the current frame and the subband width parameter for tonal component coding, a quantity of bits occupied by the position-quantity parameter of the tonal component in the current tile in the current frame; and obtaining the position-quantity parameter of the tonal component in the current tile in the current frame from the encoded bitstream based on the quantity of bits occupied by the position-quantity parameter of the tonal component in the current tile in the current frame.

In some embodiments, the width information of the current tile is determined by distribution of the tiles in which tonal component coding is performed, and the distribution of the tiles in which tonal component coding is performed is determined based on the tile number parameter for tonal component coding.

In some embodiments, that the decoding unit 520 obtains the amplitude or energy parameter of the tonal component in the at least one tile in the current frame from the encoded bitstream includes:

if the tile-level tonal component flag parameter of the current tile in the current frame is the set value S4, obtaining the amplitude or energy parameter of the tonal component in the current tile in the current frame from the encoded bitstream based on the position-quantity parameter of the tonal component in the current tile in the current frame.

It may be understood that functions of functional modules of the audio decoder 500 in this embodiment may be specifically implemented based on, for example, the method in the method embodiment corresponding to FIG. 4-A.

Figure 6:
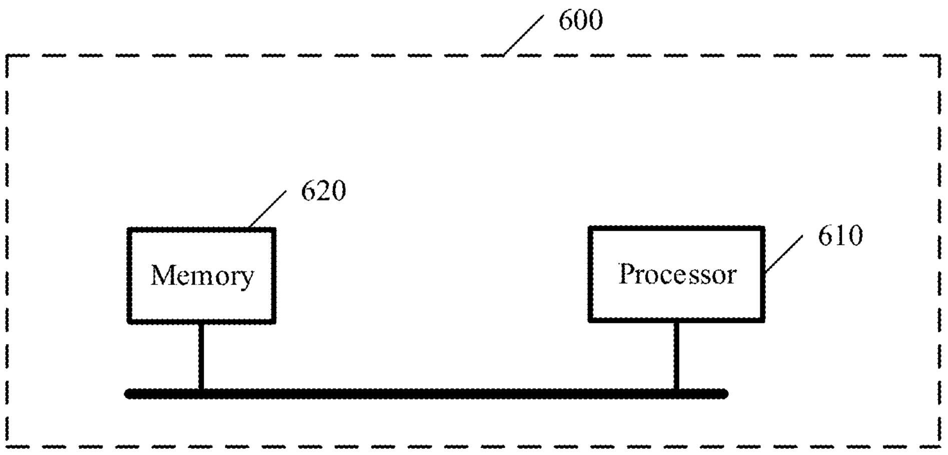
FIG. 6 is a schematic diagram of another audio decoder according to an embodiment of this application.

Refer to FIG. 6. An embodiment of this application further provides an audio decoder 600, which may include a processor 610. The processor is coupled to a memory 620, and the memory 620 stores a program. When the program instructions stored in the memory are executed by the processor, some or all of the operations of the audio decoding method in embodiments of this application are implemented.

The processor 610 may also be referred to as a central processing unit (CPU). In specific application, components of the audio decoder are coupled together, for example, through a bus system. The bus system may further include a power bus, a control bus, a status signal bus, and the like, in addition to a data bus. The method disclosed in the foregoing embodiments of this application may be applied to the processor 610, or implemented by the processor 610. The processor 610 may be an integrated circuit chip and has a signal processing capability. In some implementation processes, some or all of the operations in the foregoing methods may be implemented by using an integrated logical circuit of hardware in the processor 610, or by using instructions in a form of software. The processor 610 may be a general-purpose processor, a digital signal processor, an application-specific integrated circuit, a field programmable gate array or another programmable logic device, a discrete gate or a transistor logic device, or a discrete hardware component. The processor 610 may implement or perform methods, operations, and logical block diagrams disclosed in embodiments of this application. The processor 610 may be a microprocessor, or the processor may be any conventional processor or the like. Operations of the methods disclosed with reference to embodiments of this application may be directly executed and accomplished by a hardware decoding processor, or may be executed and accomplished by using a combination of hardware and a software module in the decoding processor.

The software module may be located in a mature storage medium in the art, for example, a random access memory, a flash memory, a read-only memory, a programmable read-only memory, an electrically erasable programmable memory, or a register. The storage medium is located in the memory 620. For example, the processor 610 may read information from the memory 620, and implements some or all of the operations of the foregoing method in combination with hardware of the processor 610.

An embodiment of this application further provides an audio encoder, which may include a processor. The processor is coupled to a memory, and the memory stores a program. When the program instructions stored in the memory are executed by the processor, some or all operations of the audio encoding method in embodiments of this application are implemented.

Figure 7:
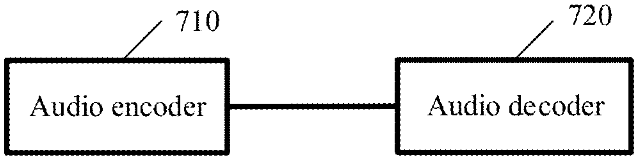
FIG. 7 is a schematic diagram of a communication system according to an embodiment of this application.

Refer to FIG. 7. An embodiment of this application further provides a communication system, including:

an audio encoder 710 and an audio decoder 720, where the audio decoder 720 is any audio decoder provided in embodiments of this application.

Figure 8:
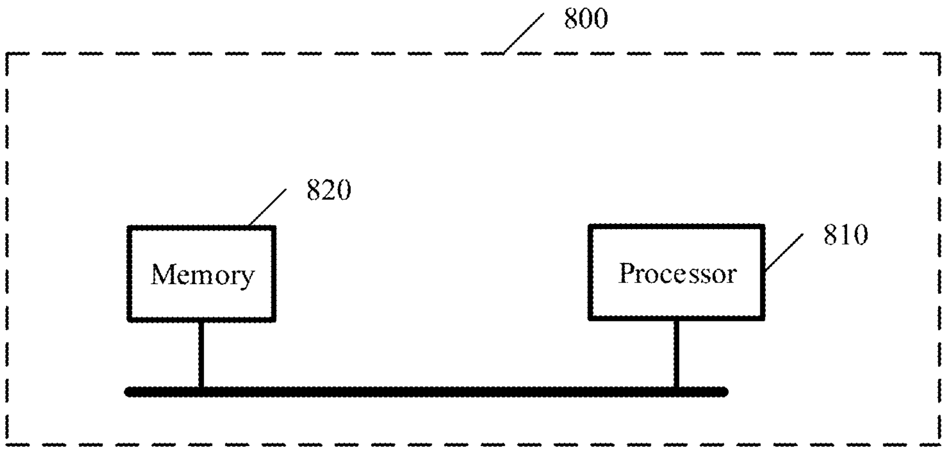
FIG. 8 is a schematic diagram of a network device according to an embodiment of this application.

Refer to FIG. 8. An embodiment of this application further provides a network device 800, including a processor 810 and a memory 820. The processor 810 is coupled to the memory 820, and is configured to read and execute instructions stored in the memory, to implement some or all operations of the audio encoding/decoding method in embodiments of this application.

The network device 800 is, for example, a chip or a system on chip.

An embodiment of this application further provides a computer-readable storage medium. The computer-readable storage medium stores a computer program. When the computer program is executed by hardware (for example, a processor), some or all operations of the audio encoding/decoding method in embodiments of this application can be completed.

An embodiment of this application further provides a computer-readable storage medium. The computer-readable storage medium stores a computer program. The computer program is executed by hardware (for example, a processor), to perform some or all of the operations of any method performed by any device in embodiments of this application.

An embodiment of this application further provides a computer program product including instructions. When the computer program product runs on a computer device, the computer device is enabled to perform some or all operations of any audio encoding/decoding method in embodiments of this application.

A part or all of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like.

In the foregoing embodiments, the description of each embodiment has respective focuses. For a part that is not described in detail in an embodiment, refer to related descriptions in other embodiments.

In the several embodiments provided in this application, it should be understood that the disclosed apparatuses may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technologies, or all or a part of the technical solutions may be implemented in a form of a software product. The computer software product is stored in a storage medium and includes several instructions for instructing a computer device (which may be a personal computer, a server, a network device, or the like) to perform all or a part of the operations of the methods described in embodiments of this application. The foregoing storage medium may include, for example, any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. An audio decoding method, comprising:

obtaining an encoded bitstream;

performing bitstream demultiplexing on the encoded bitstream to obtain a first coding parameter of a current frame of an audio signal;

performing bitstream demultiplexing on the encoded bitstream based on a configuration parameter for tonal component coding to obtain a second coding parameter of the current frame, wherein the second coding parameter of the current frame comprises a tonal component parameter of the current frame;

obtaining a first high frequency band signal and a first low frequency band signal of the current frame based on the first coding parameter;

obtaining a second high frequency band signal of the current frame based on the second coding parameter and the configuration parameter for tonal component coding;

obtaining a decoded signal of the current frame based on the first high frequency band signal, the second high frequency band signal, and the first low frequency band signal;

obtaining a configuration bitstream; and performing bitstream demultiplexing on the configuration bitstream to obtain a decoder configuration parameter including the configuration parameter for tonal component coding, wherein the configuration parameter for tonal component coding indicates a number of tiles in which tonal component coding is performed and a subband width of each tile, wherein the performing bitstream demultiplexing on the configuration bitstream to obtain a decoder configuration parameter comprises:

obtaining a tile number parameter for tonal component coding and a flag parameter indicating a same subband width from the configuration bitstream, wherein the flag parameter indicating the same subband width indicates whether different tiles use the same subband width; and obtaining, based on the tile number parameter for tonal component coding and the flag parameter indicating the same subband width, a subband width parameter for tonal component coding in at least one tile from the configuration bitstream.

2. The method according to claim 1, wherein obtaining the subband width parameter for tonal component coding in the at least one tile from the configuration bitstream comprises:

when the flag parameter indicating the same subband width is a set value S1, obtaining a common subband width parameter from the configuration bitstream, wherein the subband width parameter for tonal component coding in the at least one tile is equal to the common subband width parameter, or the subband width parameter for tonal component coding in the at least one tile is obtained through transform based on the common subband width parameter; or when the flag parameter indicating the same subband width is a set value S2, obtaining the subband width parameter for tonal component coding in the at least one tile from the configuration bitstream, wherein a quantity of subband width parameters for tonal component coding in the at least one tile is equal to the number of tiles in which tonal component coding is performed indicated based on the tile number parameter for tonal component coding, or a quantity of subband width parameters for tonal component coding in the at least one tile is obtained through transform based on the tile number parameter for tonal component coding.

3. The method according to claim 1, wherein the tonal component parameter of the current frame comprises one or more of the following parameters: a frame-level tonal component flag parameter of the current frame, a tile-level tonal component flag parameter of the at least one tile in the current frame, a noise floor parameter of the at least one tile in the current frame, a position-quantity information multiplexing parameter of a tonal component, a position-quantity parameter of the tonal component, or an amplitude or energy parameter of the tonal component.

4. The method according to claim 3, wherein the configuration parameter for tonal component coding comprises the tile number parameter for tonal component coding; and the performing bitstream demultiplexing on the encoded bitstream based on a configuration parameter for tonal component coding to obtain a second coding parameter of the current frame comprises:

obtaining the frame-level tonal component flag parameter of the current frame from the encoded bitstream; and when the frame-level tonal component flag parameter of the current frame is a set value S3, obtaining tonal component parameters of N1 tiles in the current frame from the encoded bitstream, wherein N1 is equal to a number of tiles in which tonal component coding is performed in the current frame indicated based on the tile number parameter for tonal component coding in the current frame.

5. The method according to claim 4, wherein the obtaining tonal component parameters of N1 tiles in the current frame from the encoded bitstream comprises:

obtaining a tile-level tonal component flag parameter of a current tile in the N1 tiles in the current frame from the encoded bitstream; and when the tile-level tonal component flag parameter of the current tile in the current frame is a set value S4, obtaining one or more of the following tonal component parameters from the encoded bitstream: a noise floor parameter, a position-quantity information multiplexing parameter of a tonal component, a position-quantity parameter of the tonal component, or an amplitude or energy parameter of the tonal component in the current tile in the current frame.

6. The method according to claim 5, wherein obtaining the position-quantity information multiplexing parameter of the tonal component and the position-quantity parameter of the tonal component in the current tile in the current frame from the encoded bitstream comprises:

obtaining a position-quantity information multiplexing parameter of the current tile in the current frame from the encoded bitstream, wherein when the position-quantity information multiplexing parameter of the current tile in the current frame is a set value S5, the position-quantity parameter of the tonal component in the current tile in the current frame is equal to a position-quantity parameter of a tonal component in a current tile in a previous frame of the current frame; or the position-quantity parameter of the tonal component in the current tile in the current frame is obtained through transform based on a position-quantity parameter of a tonal component in a current tile in a previous frame of the current frame; and when the position-quantity information multiplexing parameter of the current tile in the current frame is a set value S6, obtaining the position-quantity parameter of the tonal component in the current tile in the current frame from the encoded bitstream.

7. The method according to claim 6, wherein the obtaining the position-quantity parameter of the tonal component in the current tile in the current frame from the encoded bitstream comprises:

obtaining, based on width information and the subband width parameter for tonal component coding of the current tile in the current frame, a quantity of bits occupied by the position-quantity parameter of the tonal component in the current tile in the current frame; and obtaining the position-quantity parameter of the tonal component in the current tile in the current frame from the encoded bitstream based on the quantity of bits occupied by the position-quantity parameter of the tonal component in the current tile in the current frame.

8. The method according to claim 7, wherein the width information of the current tile is determined by distribution of the tiles in which tonal component coding is performed, and the distribution of the tiles in which tonal component coding is performed is determined based on the tile number parameter for tonal component coding.

9. The method according to claim 5, wherein obtaining the amplitude or energy parameter of the tonal component in the at least one tile in the current frame from the encoded bitstream comprises:

obtaining the amplitude or energy parameter of the tonal component in the current tile in the current frame from the encoded bitstream based on the position-quantity parameter of the tonal component in the current tile in the current frame when the tile-level tonal component flag parameter of the current tile in the current frame is the set value S4.

10. An audio decoder, comprising:

at least one processor; and one or more memories coupled to the at least one processor and storing programming instructions for execution by the at least one processor to cause the audio decoder to:

obtain an encoded bitstream;

perform bitstream demultiplexing on the encoded bitstream to obtain a first coding parameter of a current frame of an audio signal;

perform bitstream demultiplexing on the encoded bitstream based on a configuration parameter for tonal component coding to obtain a second coding parameter of the current frame, wherein the second coding parameter of the current frame comprises a tonal component parameter of the current frame;

obtain a first high frequency band signal and a first low frequency band signal of the current frame based on the first coding parameter;

obtain a second high frequency band signal of the current frame based on the second coding parameter and the configuration parameter for tonal component coding;

obtain a decoded signal of the current frame based on the first high frequency band signal, the second high frequency band signal, and the first low frequency band signal;

obtain a configuration bitstream;

perform bitstream demultiplexing on the configuration bitstream to obtain a decoder configuration parameter including the configuration parameter for tonal component coding, wherein the configuration parameter for tonal component coding indicates a number of tiles in which tonal component coding is performed and a subband width of each tile;

obtain a tile number parameter for tonal component coding and a flag parameter indicating a same subband width from the configuration bitstream, wherein the flag parameter indicating the same subband width indicates whether different tiles use the same subband width; and obtain, based on the tile number parameter for tonal component coding and the flag parameter indicating the same subband width, a subband width parameter for tonal component coding in at least one tile from the configuration bitstream.

11. The audio decoder according to claim 10, wherein the programming instructions for execution by the at least one processor to cause the audio decoder further to:

when the flag parameter indicating the same subband width is a set value S1, obtain a common subband width parameter from the configuration bitstream, wherein the subband width parameter for tonal component coding in the at least one tile is equal to the common subband width parameter, or the subband width parameter for tonal component coding in the at least one tile is obtained through transform based on the common subband width parameter; or when the flag parameter indicating the same subband width is a set value S2, obtain the subband width parameter for tonal component coding in the at least one tile from the configuration bitstream, wherein a quantity of subband width parameters for tonal component coding in the at least one tile is equal to the number of tiles in which tonal component coding is performed indicated based on the tile number parameter for tonal component coding, or a quantity of subband width parameters for tonal component coding in the at least one tile is obtained through transform based on the tile number parameter for tonal component coding.

12. The audio decoder according to claim 10, wherein the tonal component parameter of the current frame comprises one or more of the following parameters: a frame-level tonal component flag parameter of the current frame, a tile-level tonal component flag parameter of the at least one tile in the current frame, a noise floor parameter of the at least one tile in the current frame, a position-quantity information multiplexing parameter of a tonal component, a position-quantity parameter of the tonal component, or an amplitude or energy parameter of the tonal component.

13. The audio decoder according to claim 12, wherein the configuration parameter for tonal component coding comprises the tile number parameter for tonal component coding; and wherein the programming instructions for execution by the at least one processor to cause the audio decoder further to:

obtain the frame-level tonal component flag parameter of the current frame from the encoded bitstream; and when the frame-level tonal component flag parameter of the current frame is a set value S3, obtain tonal component parameters of N1 tiles in the current frame from the encoded bitstream, wherein N1 is equal to the number of tiles in which tonal component coding is performed in the current frame indicated based on the tile number parameter for tonal component coding in the current frame.

14. The audio decoder according to claim 13, wherein the programming instructions for execution by the at least one processor to cause the audio decoder further to:

obtain a tile-level tonal component flag parameter of a current tile in the N1 tiles in the current frame from the encoded bitstream; and when the tile-level tonal component flag parameter of the current tile in the current frame is a set value S4, obtain one or more of the following tonal component parameters from the encoded bitstream: a noise floor parameter, a position-quantity information multiplexing parameter of a tonal component, a position-quantity parameter of the tonal component, or an amplitude or energy parameter of the tonal component in the current tile in the current frame.

15. The audio decoder according to claim 14, wherein the programming instructions for execution by the at least one processor to cause the audio decoder further to:

obtain a position-quantity information multiplexing parameter of the current tile in the current frame from the encoded bitstream, wherein when the position-quantity information multiplexing parameter of the current tile in the current frame is a set value S5, the position-quantity parameter of the tonal component in the current tile in the current frame is equal to a position-quantity parameter of a tonal component in a current tile in a previous frame of the current frame; or the position-quantity parameter of the tonal component in the current tile in the current frame is obtained through transform based on a position-quantity parameter of a tonal component in a current tile in a previous frame of the current frame; and when the position-quantity information multiplexing parameter of the current tile in the current frame is a set value S6, obtain the position-quantity parameter of the tonal component in the current tile in the current frame from the encoded bitstream.

16. The audio decoder according to claim 15, wherein the programming instructions for execution by the at least one processor to cause the audio decoder further to:

obtain, based on width information and the subband width parameter for tonal component coding of the current tile in the current frame, a quantity of bits occupied by the position-quantity parameter of the tonal component in the current tile in the current frame; and obtain the position-quantity parameter of the tonal component in the current tile in the current frame from the encoded bitstream based on the quantity of bits occupied by the position-quantity parameter of the tonal component in the current tile in the current frame.

17. The audio decoder according to claim 16, wherein the width information of the current tile is determined by distribution of the tiles in which tonal component coding is performed, and the distribution of the tiles in which tonal component coding is performed is determined based on the tile number parameter for tonal component coding.

18. The audio decoder according to claim 14, wherein the programming instructions for execution by the at least one processor to cause the audio decoder further to:

obtain the amplitude or energy parameter of the tonal component in the current tile in the current frame from the encoded bitstream based on the position-quantity parameter of the tonal component in the current tile in the current frame when the tile-level tonal component flag parameter of the current tile in the current frame is the set value S4.

19. A computer program product comprising computer-executable instructions stored on a non-transitory computer-readable medium that, when executed by a processor, cause an audio decoder to:

obtain an encoded bitstream;

perform bitstream demultiplexing on the encoded bitstream to obtain a first coding parameter of a current frame of an audio signal;

perform bitstream demultiplexing on the encoded bitstream based on a configuration parameter for tonal component coding to obtain a second coding parameter of the current frame, wherein the second coding parameter of the current frame comprises a tonal component parameter of the current frame;

obtain a first high frequency band signal and a first low frequency band signal of the current frame based on the first coding parameter;

obtain a second high frequency band signal of the current frame based on the second coding parameter and the configuration parameter for tonal component coding;

obtain a decoded signal of the current frame based on the first high frequency band signal, the second high frequency band signal, and the first low frequency band signal;

obtain a configuration bitstream;

perform bitstream demultiplexing on the configuration bitstream to obtain a decoder configuration parameter including the configuration parameter for tonal component coding, wherein the configuration parameter for tonal component coding indicates a number of tiles in which tonal component coding is performed and a subband width of each tile;

obtain a tile number parameter for tonal component coding and a flag parameter indicating a same subband width from the configuration bitstream, wherein the flag parameter indicating the same subband width indicates whether different tiles use the same subband width; and obtain, based on the tile number parameter for tonal component coding and the flag parameter indicating the same subband width, a subband width parameter for tonal component coding in at least one tile from the configuration bitstream.

* * * * *